(12) United States Patent
Chajec

(10) Patent No.: US 9,586,163 B2
(45) Date of Patent: Mar. 7, 2017

(54) FILTER ASSEMBLY WITH MODULAR RELIEF VALVE INTERFACE

(71) Applicant: Davco Technology, LLC, Saline, MI (US)

(72) Inventor: Zdzislaw Chajec, Saline, MI (US)

(73) Assignee: Davco Technology, LLC, Saline, MI (US)

( * ) Notice: Subject to any disclaimer, the term of this patent is extended or adjusted under 35 U.S.C. 154(b) by 304 days.

(21) Appl. No.: 14/039,373

(22) Filed: Sep. 27, 2013

(65) Prior Publication Data

US 2014/0021110 A1 Jan. 23, 2014

Related U.S. Application Data

(63) Continuation of application No. 12/884,960, filed on Sep. 17, 2010, now Pat. No. 8,574,430.

(Continued)

(51) Int. Cl.

| | |
|---|---|
| *B01D 35/00* | (2006.01) |
| *B01D 35/30* | (2006.01) |
| *B01D 29/21* | (2006.01) |
| *B01D 35/143* | (2006.01) |
| *B01D 36/00* | (2006.01) |

(52) U.S. Cl.
CPC ........... *B01D 35/306* (2013.01); *B01D 29/21* (2013.01); *B01D 35/143* (2013.01); *B01D 36/001* (2013.01); *B01D 2201/291* (2013.01); *B01D 2201/309* (2013.01); *B01D 2201/4046* (2013.01)

(58) Field of Classification Search
None
See application file for complete search history.

(56) References Cited

U.S. PATENT DOCUMENTS

| 34,166 A | 1/1862 | Schaffer et al. |
|---|---|---|
| 2,145,304 A | 1/1939 | Hill |

(Continued)

FOREIGN PATENT DOCUMENTS

| DE | 19541962 A1 | 5/1997 |
|---|---|---|
| JP | 60084484 A | 5/1985 |
| JP | 10159530 A | 6/1998 |

OTHER PUBLICATIONS

Plastisonics, ViSUfilter, catalog, no date, all pages, Chicago, Illinois.

(Continued)

*Primary Examiner* — Dirk Bass
(74) *Attorney, Agent, or Firm* — Young Basile Hanlon & MacFarlane, P.C.

(57) ABSTRACT

A fluid filter assembly for filtering a fluid includes a housing base portion having an axially extending tube, a housing cover that is connected to the housing base portion to define an interior space, a filter element, and an interface structure. The filter element is disposed within the interior space and in engagement with the axially extending tube, the filter element having a filter media, a bottom end cap, a top end cap, and a mounting member defined by the top end cap, the mounting member having an axial wall with a vent passage therethrough and a radial wall that encircles the axial wall. The interface structure is connected to the housing cover and engages the top end cap of the filter element.

19 Claims, 19 Drawing Sheets

Related U.S. Application Data

(60) Provisional application No. 61/243,185, filed on Sep. 17, 2009, provisional application No. 61/309,171, filed on Mar. 1, 2010.

(56) References Cited

U.S. PATENT DOCUMENTS

| | | | |
|---|---|---|---|
| 2,179,784 | A | 11/1939 | Frudden |
| 2,635,174 | A | 4/1953 | Kasten |
| 2,638,581 | A | 5/1953 | Marvel |
| 2,669,707 | A | 2/1954 | Mould et al. |
| 2,790,560 | A | 4/1957 | Beyland |
| 2,792,116 | A | 5/1957 | Lenz et al. |
| 2,998,138 | A | 8/1961 | Mould et al. |
| 3,054,391 | A | 9/1962 | Rocklen |
| 3,105,042 | A | 9/1963 | Roosa |
| 3,122,501 | A | 2/1964 | Hultgren |
| 3,224,583 | A | 12/1965 | Rosaen |
| 3,232,437 | A | 2/1966 | Hultgren |
| 3,237,770 | A | 3/1966 | Humbert, Jr. |
| 3,239,064 | A | 3/1966 | White |
| 3,272,336 | A | 9/1966 | Humbert, Jr. |
| 3,297,162 | A | 1/1967 | Mouwen |
| 3,331,509 | A | 7/1967 | Gray, Jr. |
| 3,370,707 | A | 2/1968 | Nordstrom |
| 3,372,808 | A | 3/1968 | Sabo |
| 3,374,892 | A | 3/1968 | Samalon |
| 3,508,657 | A | 4/1970 | Cooper |
| 3,530,382 | A | 9/1970 | Liston et al. |
| 3,591,003 | A * | 7/1971 | Cooper ............... B01D 35/143 210/130 |
| 3,630,375 | A | 12/1971 | Hodgkins |
| 3,630,382 | A | 12/1971 | Hodgkins |
| 3,681,562 | A | 8/1972 | Winzen |
| 3,722,691 | A | 3/1973 | Francois |
| 3,749,247 | A | 7/1973 | Rohde |
| 3,815,744 | A | 6/1974 | Vanderpoel |
| 3,815,776 | A * | 6/1974 | MacMillan ........ B60K 15/0406 220/203.24 |
| 3,827,558 | A | 8/1974 | Firth |
| 3,841,484 | A | 10/1974 | Domnick |
| 3,931,011 | A | 1/1976 | Richards et al. |
| 3,954,625 | A | 5/1976 | Michalski |
| 3,992,296 | A | 11/1976 | Nobuta |
| 4,017,397 | A | 4/1977 | Copeland |
| 4,021,342 | A | 5/1977 | Schacht et al. |
| 4,054,152 | A | 10/1977 | Ito et al. |
| 4,075,097 | A | 2/1978 | Paul |
| 4,091,625 | A | 5/1978 | Fontana et al. |
| 4,139,463 | A | 2/1979 | Murphy et al. |
| 4,144,169 | A | 3/1979 | Grueschow |
| 4,153,003 | A | 5/1979 | Willis |
| 4,190,426 | A | 2/1980 | Ruschke |
| 4,271,015 | A | 6/1981 | Moore |
| 4,271,016 | A | 6/1981 | Albertson |
| 4,298,465 | A | 11/1981 | Druffel |
| 4,364,825 | A | 12/1982 | Connor, Jr. |
| 4,368,716 | A | 1/1983 | Davis |
| 4,424,128 | A | 1/1984 | Shinaver |
| 4,428,351 | A | 1/1984 | Davis |
| 4,429,665 | A | 2/1984 | Brown |
| 4,522,712 | A | 6/1985 | Fischer et al. |
| 4,540,489 | A | 9/1985 | Barnard |
| 4,544,387 | A | 10/1985 | Agerlid |
| 4,617,116 | A | 10/1986 | Seiler |
| 4,621,593 | A | 11/1986 | Rao et al. |
| 4,751,901 | A | 6/1988 | Moor |
| 4,755,239 | A | 7/1988 | O'Handley |
| 4,759,842 | A | 7/1988 | Frees et al. |
| 4,770,768 | A | 9/1988 | Lang |
| 4,818,385 | A | 4/1989 | Medley, III |
| 4,981,584 | A | 1/1991 | Nunes |
| 4,991,166 | A | 2/1991 | Lowsky et al. |
| 4,997,555 | A | 3/1991 | Church et al. |
| 5,059,217 | A | 10/1991 | Arroyo et al. |
| 5,089,132 | A | 2/1992 | Sussich et al. |
| 5,092,303 | A | 3/1992 | Brown |
| 5,098,559 | A | 3/1992 | Mack et al. |
| 5,114,570 | A | 5/1992 | Nelson et al. |
| 5,160,037 | A | 11/1992 | LeCour |
| 5,171,430 | A | 12/1992 | Beach et al. |
| 5,207,811 | A | 5/1993 | Buonpastore |
| 5,228,990 | A | 7/1993 | Chiang |
| 5,246,571 | A | 9/1993 | Woltmann |
| 5,298,160 | A | 3/1994 | Ayers et al. |
| 5,372,115 | A | 12/1994 | Straub et al. |
| 5,374,355 | A | 12/1994 | Habinger |
| 5,458,767 | A | 10/1995 | Stone |
| 5,484,523 | A | 1/1996 | Bjornsson |
| 5,538,626 | A | 7/1996 | Baumann |
| 5,545,322 | A | 8/1996 | Cheng |
| 5,549,821 | A | 8/1996 | Bounnakhom et al. |
| 5,556,542 | A | 9/1996 | Berman et al. |
| 5,695,633 | A * | 12/1997 | Ernst ..................... B01D 29/21 210/130 |
| 5,766,449 | A | 6/1998 | Davis |
| 6,955,755 | B2 | 10/2005 | Jainek |
| 7,252,759 | B2 | 8/2007 | Evanovich et al. |
| 7,393,455 | B1 | 7/2008 | Tondreau et al. |
| 2004/0164017 | A1* | 8/2004 | Knight ................... B01D 29/21 210/450 |
| 2007/0023336 | A1 | 2/2007 | Owens |
| 2008/0121575 | A1 | 5/2008 | Pabst |
| 2009/0114589 | A1* | 5/2009 | Reiland .................. B01D 29/21 210/472 |
| 2009/0139915 | A1 | 6/2009 | Tondreau et al. |
| 2010/0108590 | A1* | 5/2010 | Curt ..................... B01D 29/21 210/232 |
| 2011/0203099 | A1 | 8/2011 | Curt et al. |

OTHER PUBLICATIONS

Plastisonics, ViSUfilter: Precision In-Line Fuel Filters, catalog, no date, all pages, Chicago, Illinois.

Plastisonics, Inc., Unique Features of ViSUfilter, product description catalog, no date, all pages, Chicago, Illinois.

* cited by examiner

FILTER ASSEMBLY WITH MODULAR RELIEF VALVE INTERFACE

CROSS-REFERENCE TO RELATED APPLICATIONS

This application is a continuation of U.S. patent application Ser. No. 12/884,960, filed on Sep. 17, 2010, which claims the benefit of U.S. Provisional Patent Application Ser. No. 61/243,185, filed on Sep. 17, 2009, and which also claims the benefit of U.S. Provisional Patent Application Ser. No. 61/309,171, filed on Mar. 1, 2010.

FIELD OF THE INVENTION

The present invention relates to fluid filter assemblies, and more particularly, a fluid filter assembly having a modular interface between a fluid filter, a housing, and a pressure relief valve.

BACKGROUND OF THE INVENTION

It is well known to utilize fluid filter assemblies to filter fuel for a combustible engine of a motor vehicle. Such fluid filter assemblies comprise a variety of different orientations of the fluid filter assembly. For example, it is known to utilize sideways, downwardly, and upwardly mounted canisters having a paper filter media enclosed in the canister to form the fluid filter assembly. With respect to upwardly mounted fluid filter assemblies, prior art filtration devices have been known to provide fuel to the fluid filter assembly by use of a pump. The fuel is directed downward into a lower chamber of the fluid filter assembly wherein the fuel flow proceeds upward into an upper filter chamber of the fluid filter assembly. The fuel may then be contained and sealed by a transparent cover or enclosure of the fluid filter assembly for viewing the fuel level within the upper filter chamber. A filter mount separates the lower chamber from the upper chamber of the fluid filter assembly.

Within the filter chamber of the fluid filter assembly, the fluid filter assembly may provide a filter canister comprised of a filter media that is contained by filter end caps at the top and bottom of the filter media. The filter media may, optionally, encircle a central filter tube that provides additional support for the filter media. The end caps are sealed to the edges of the filter media to preclude any possible leak paths at the ends of the filter canister. The filter media typically comprises a meltblown plastic material or a porous paper material that may be pleated or concentrically wound so as to direct the fluid through the filter media. The filter media removes undesirable contaminants from the fuel by retaining the contaminants within and on the filter media.

As fluid enters the filter chamber, the fuel level rises and passes through from the outside to the inside of the filter media. The fuel then flows downward into a central passage located along the central axis of the canister. The central passageway is in communication with a fuel outlet wherein the fuel passes outwardly from the fluid filter assembly.

During the filtering process, the fuel is either drawn into the filter chamber by a vacuum created by a pump downstream from the fluid filter assembly, or the fuel may be pushed into the filter chamber by pressure created by a pump upstream from the fluid filter assembly. As the fuel flows through the filter media, dirt and other contaminants larger than the porous openings in the filter media are trapped and retained by the filter media. These contaminants plug or clog the porous holes in the filter media and restrict or close the paths used by the flowing fuel. The fuel is then forced to seek other open and less restrictive flow openings which are available above the level of the fuel by having the fuel level climb the height of the filter media and access the clean areas of the filter media. This process of clogging and climbing continues until the filter media is completely immersed in the flowing fuel.

Even though the filter media may be completely immersed in the flowing fluid, the incoming fuel continues to pass through the filter media. It is not until the filter media becomes greatly clogged that the filter canister needs to be replaced. This is a problem since the user generally views the height of the fuel in the filter chamber to determine if the filter media is clogged. If the filter media is completely immersed in fuel, the user generally believes that the filter canister needs to be replaced. Therefore, this type of system may lead to premature replacement of the filter canister.

It is known that the system described above may be improved upon by providing a divider and a pressure relief valve on the filter canister. The divider is connected to a top end cap of the filter canister and wraps around the filter media. It functions to divide the portion of the housing adjacent to the filter media into an inner region that is defined between the filter media and the divider, and an outer region that is defined between the divider and the housing. The divider allows the fluid in the inner region to rise fully before the fluid in the outer region begins to rise. The fluid in the outer region rises when fluid and/or air/vapor passes through the pressure relief valve when the pressure across the filter media exceeds a predetermined pressure. The pressure relief valve is mounted in an end cap of the filter canister. While this system provides a more accurate indication of the remaining life of the filter media, the complexity and the cost of the filter canister is increased over previous designs by its incorporation of a divider and a pressure relief valve. Since the filter canister is routinely replaced when the filter media becomes clogged, the increased cost of the filter canister is an undesirable factor in maintaining the fluid filter assembly.

Furthermore, in the systems described above, it is common to mount the filter upon an outlet pipe that is formed on a base portion of the fluid filter assembly. The filter is typically biased into engagement with the base portion and the outlet pipe by using a spring that engages the cover of the fluid filter assembly as well as a top end of the filter canister. In such systems, the filter cartridge can be installed such that it is not perfectly aligned along the filter cartridge axis defined by the outlet pipe of the base portion of the fluid filter assembly, resulting in uneven exposure of the filter media to the fluid within the fluid filter assembly and potentially reducing the accuracy of the visual indication of remaining life provided by the fluid level within the fluid filter assembly.

It would be desirable to provide a fluid filter assembly that provides an accurate indication as to the remaining usefulness of the filter media while reducing the complexity and cost of replacing the fuel filter canister. It would also be desirable to provide a fluid filter assembly that provides for accurate axial alignment within the fluid filter assembly.

SUMMARY OF THE INVENTION

The invention provides a fluid filter assembly for filtering a fluid. The fluid filter assembly includes an upright housing having a base portion and a cover that cooperate to define an interior space of the upright housing. The base portion has a fluid inlet for communicating the fluid into the upright housing and a fluid outlet for communicating the fluid downstream of the upright housing. The cover allows viewing of the level of fluid in the upright housing. The fluid filter assembly also includes a filter element. An exterior of the filter element is in communication with the fluid inlet, and an interior of the filter element is in communication with the fluid outlet. The filter element has a filter media for filtering the fluid as it passes from the exterior of the filter element to the interior of the filter element. A bottom end cap of the filter element is connected to the fluid outlet, and a top end cap of the filter element is positioned above the bottom end cap. A mounting member is formed on the top end cap of the filter element, and a vent passage extends through the mounting member for fluid communication between the interior of the filter element and the exterior of the filter element. The fluid filter assembly further includes an interface structure that is connected to the cover of the upright housing and is removably engageable with the mounting member of the filter element.

The fluid filter assembly may include a pressure relief valve that is in communication with the interior and the exterior of the filter element for selectively allowing the fluid and/or air/vapor to pass through the vent passage of the filter element valve when the pressure across the filter element reaches a predetermined level. The passage of fluid and/or air/vapor through the pressure relief valve raises the level of the fluid within the upright housing. The pressure relief valve may be integrated into the top end cap of the filter element.

The fluid filter assembly may also include an interface structure with an interface housing having an upper interior portion that is in communication with the exterior of the filter element and a lower interior portion that is in communication with the interior of the filter element and sealed with respect thereto. A pressure relief valve is in communication with the upper interior portion and the lower interior portion of the interface housing of the interface structure for selectively allowing the fluid and/or air/vapor to pass through the vent passage of the filter element valve when the pressure across the filter element reaches a predetermined level wherein the passage of fluid and/or air/vapor through the pressure relief valve raises the level of the fluid within the upright housing.

The interface structure may have a threaded connection with respect to the cover of the upright housing. The interface structure may also include an upper portion that is disposed at least partially outside of the cover of the upright housing to allow tightening of the threaded connection of the interface structure with respect to the cover of the upright housing. The interface structure may additionally include a lower portion having the threaded portion formed thereon, the lower portion connected to the upper portion for rotation in unison therewith when the torque applied to the upper portion is less than a predetermined torque value and for slipping with respect to the upper portion when the torque applied to the upper portion is greater than a predetermined torque value.

The interface structure may be engageable with the mounting member of the filter element to axially align the filter element with respect to the cover.

The mounting member may include an annular wall that encircles the vent passage, the annular wall being engageable with the interface structure to axially align the filter element with respect to the cover.

The cover may be at least translucent. Furthermore, the cover may be transparent.

A divider may be positioned adjacent to the exterior of the filter media. The divider has an upper end connected to the top end cap of the filter element and an open lower end that is longitudinally spaced from the bottom end cap of the filter element. Thus, at least a portion of the filter media located adjacent to the bottom cap is not directly adjacent to the divider. The divider extends a majority of the distance from the top end cap to the bottom end cap.

Alternatively, a divider may be positioned inside the cover of the upright housing adjacent to the cover. The divider has an upper end that is sealable with respect to the top end cap of the filter media to define an inner portion of the interior space of the upright housing between the divider and filter element and an outer portion of the interior space of the upright housing between the divider and the cover. The inner and outer portions of the interior space of the upright housing may be in fluid communication solely at a bottom end of the divider. Furthermore, the divider may be fabricated from an opaque material to block visibility of the fluid level in the inner portion of the interior space of the upright housing.

A further aspect of the disclosed embodiments is a fluid filter assembly for filtering a fluid that includes a housing base portion having an axially extending tube, a housing cover, wherein the housing cover is connected to the housing base portion to define an interior space, a filter element, and an interface structure. The filter element is disposed within the interior space and is in engagement with the axially extending tube. The filter element has a filter media, a bottom end cap connected to the filter media, a top end cap connected to the filter media, and a mounting member defined by the top end cap. The mounting member has an axial wall with a vent passage therethrough and a radial wall that encircles the axial wall. The interface structure is connected to the housing cover and has an annular engaging part that defines a central opening. The interface structure engages the top end cap of the filter element such that the mounting member of the top end cap is disposed within the central opening and the annular engaging part encircles the radial wall of the mounting member.

A further aspect of the disclosed embodiments is a fluid filter assembly for filtering a fluid that includes a housing base portion having an axially extending tube, a housing cover having a threaded opening, wherein the housing cover is connected to the housing base portion to define an interior space, a filter element and an interface structure. The filter element is disposed within the interior space and is in engagement with the axially extending tube. The filter element has a filter media, a bottom end cap connected to the filter media, a top end cap connected to the filter media, and a mounting member defined by the top end cap. The interface structure has an upper portion that is threadedly connected to the threaded opening of the housing cover, and a lower portion that is engageable with the mounting member of the top end cap of the filter element. The lower portion is connected to the upper portion for rotation in unison therewith when the torque applied to the upper portion is less than a predetermined torque value and for slipping with respect to the upper portion when the torque applied to the upper portion is greater than a predetermined torque value.

A further aspect of the disclosed embodiments is a fluid filter assembly for filtering a fluid that includes a housing base portion having an axially extending tube, a housing cover, wherein the housing cover is connected to the housing base portion to define an interior space, a filter element, and a divider. The filter element is disposed within the interior space and in engagement with the axially extending tube.

The filter element has a filter media, a bottom end cap connected to the filter media, and a top end cap connected to the filter media. The divider is connected to the housing cover and is positioned inside the housing cover. The divider has an upper end that is sealable with respect to the top end cap of the filter media to define an inner portion of the interior space between the divider and filter element and an outer portion of the interior space between the divider and the housing cover, wherein the divider includes a plurality of spaced-apart ribs that connect the divider to the housing cover.

BRIEF DESCRIPTION OF THE DRAWINGS

The description herein makes reference to the accompanying drawings wherein like referenced numerals refer to like parts throughout several views and wherein.

DETAILED DESCRIPTION OF THE EMBODIMENTS

Figure 1:
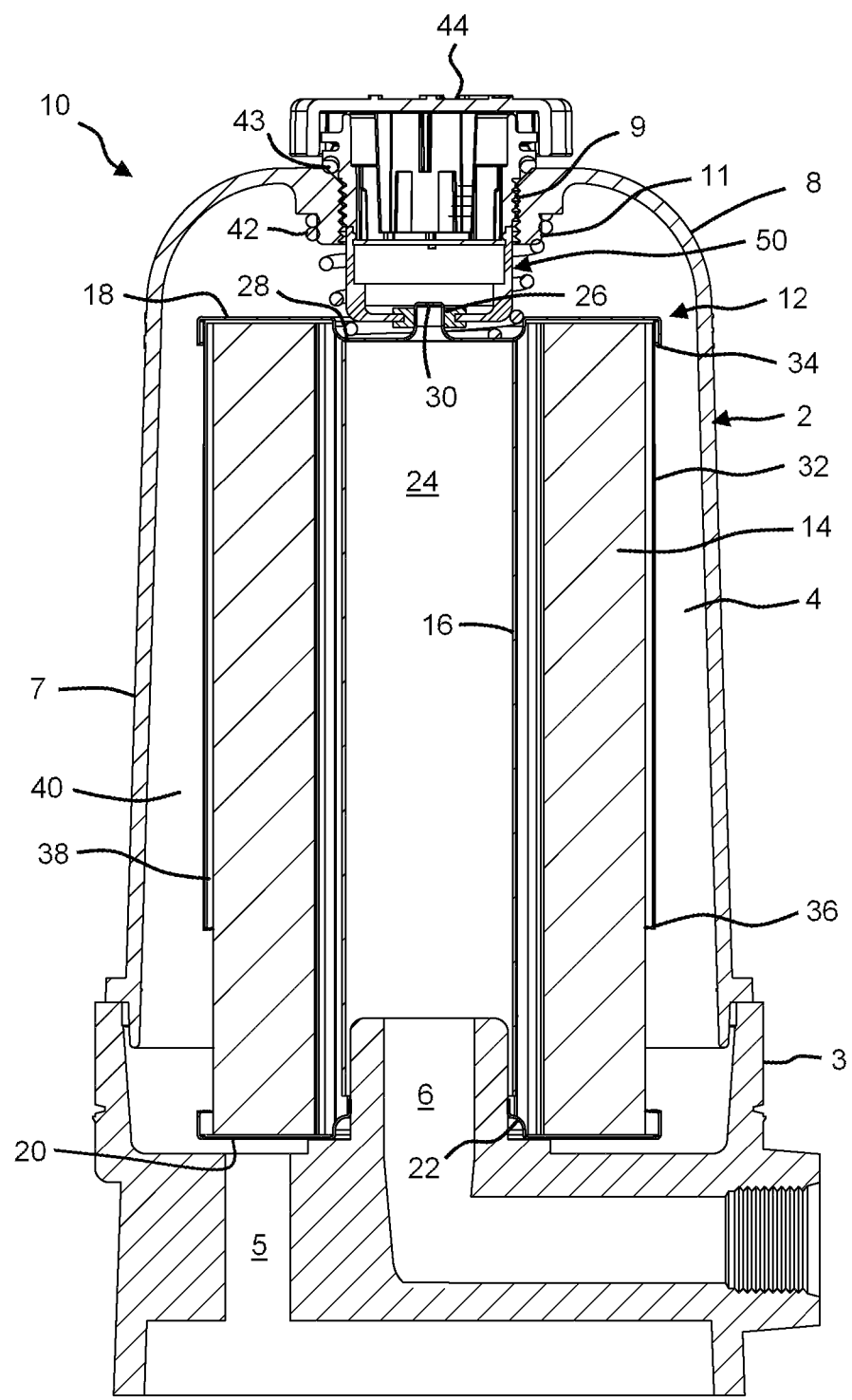
FIG. 1 is a schematic drawing showing a fluid filter assembly having a vent knob with an integrated relief valve according to a first embodiment of the present invention.
Figure 2:
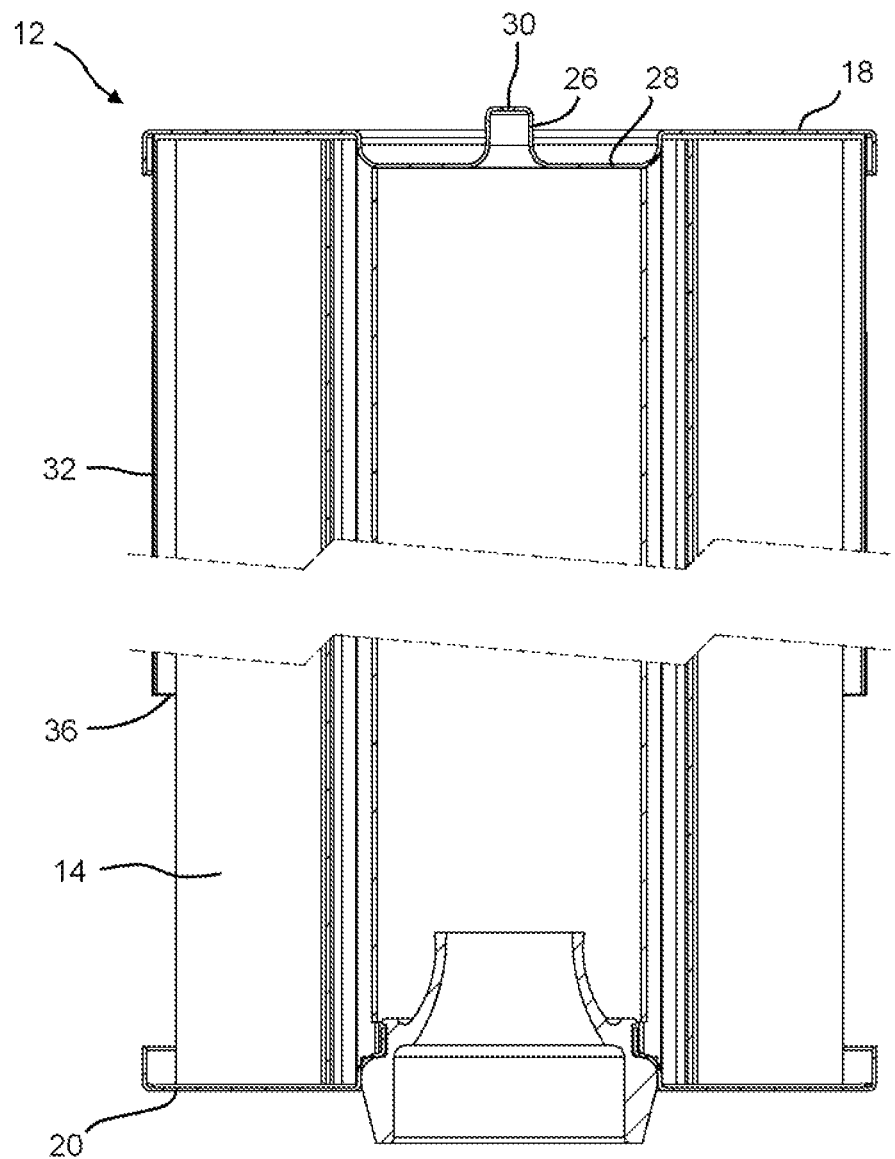
FIG. 2 is a side view showing a fuel filter for use with the fluid filter assembly of FIG. 1 of the present invention.

Referring to the drawings, the present invention will now be described in detail with reference to the preferred embodiment.

FIGS. 1-4 show a fluid filter assembly 10 according to the present invention. The fluid filter assembly 10 includes a fluid filter 12 having a filter element 14 for filtering and processing fluids including, but not limited to, diesel fuel, gasoline, oil, water, air, and antifreeze. The fluid filter assembly 10 includes a substantially cylindrical, upright housing 2 that is connected to a base portion 3 that defines an interior space 4 of the fluid filter assembly 10. Preferably, the upright housing 2 is oriented vertically. The fluid filter assembly 10 is adapted to receive the fluid filter 12 within the interior space 4. The fluid filter assembly 10 also has a pressure relief structure 50 separate from the fluid filter 12, that opens when the pressure level across the filter element 14 reaches a predetermined level, thereby allowing fluid and/or air/vapor to pass through the pressure relief structure 50 and allowing the level of fluid to rise within the fluid filter assembly 10. The pressure relief structure 50 acts as an interface between the fluid filter 12 and the upright housing 2. Because the pressure relief structure 50 is separate from the fluid filter 12 of the fluid filter assembly 10, the cost of replacing a clogged fluid filter 12 is substantially reduced compared to a fluid filter having a built-in pressure relief valve.

The upright housing 2 of the fluid filter assembly 10 is typically fabricated from a transparent or translucent material so that the level of the fluid in the interior space 4 of the upright housing 2 may be viewed from the exterior of the fluid filter assembly 10. The upright housing 2 is hollow and generally cylindrical, having side walls 7 and a substantially semi-spherical domed top portion 8. A threaded bore 9 is formed through the substantially semi-spherical domed top portion 8, and a complementarily threaded vent cap 44 is receivable within the threaded bore 9 to equalize the air pressure within the interior space 4 of the fluid filter assembly 10 with atmospheric pressure to facilitate installation and removal of the upright housing 2 with respect to the base portion 3. The threaded bore 9 is in substantial alignment with a longitudinal axis of the upright housing 2. In order to seal the threaded vent cap 44 with respect to the upright housing 2, a sealing ring 43 encircles the threaded vent cap 44 and is disposed between the threaded vent cap 44 and the semi-spherical domed top portion 8 of the upright housing 2.

A fluid inlet 5 is formed in the base portion 3 and is adapted to supply fluid into the enclosed interior space 4 for contact of the fluid with the filter element 14 of the fluid filter 12. A fluid outlet 6 includes a tube-like member formed near the center of the base portion 3 so that the fluid outlet 6 may extend into the fluid filter assembly 10 to receive and direct filtered fluid outwardly away from the fluid filter assembly 10. In the foregoing, the fluid filter assembly 10 is described as an outside to inside fluid filter assembly 10, wherein fluid is filtered by moving from the exterior of the fluid filter 12 to the interior of the fluid filter 12. However, it should be understood that the fluid filter assembly 10 could also be utilized in a filtering process where fluid is filtered in an inside-to-outside manner, wherein fluid is filtered by moving the fluid from the interior of the fluid filter 12 to the exterior of the fluid filter 12, in which case, the roles of the fluid inlet 5 and the fluid outlet 6 would be reversed.

To filter contaminants from the fluid, the fluid filter 12 includes a filter element 14. The filter element 14 is fabricated from a porous, fluid permeable material that is adapted to trap contaminants. As an example, the filter element 14 may be fabricated from a meltblown plastic material or a paper material. The filter element 14 encircles a central filter tube 16 and is contained by a top end cap 18 and a bottom end cap 20, respectively. However, the central filter tube 16 is optional and could be omitted. The top and bottom end caps 18, 20 are sealed to the edges of the filter element 14 to preclude any possible leak paths at the ends of the filter element 14. A flexible seal 22 is provided on the bottom end cap 20 of the filter element 14 to create a seal between the fluid outlet 6 and the bottom end cap 20 of the filter element 14 and ensure that unfiltered fluid does not leak into or escape through the fluid outlet 6. The filter element 14 is preferably pleated or concentrically wound but may also be arranged in any of the ways known to one familiar with filtration construction so as to direct the fluid through the filter element 14. In addition, the filter element 14 may be fabricated from a hydrophobic filter material to filter out water from the fluid.

In order to connect the fluid filter 12 to the pressure relief structure 50, an upstanding nozzle 26 is formed on the top end cap 18 of the fluid filter 12. The nozzle 26 typically extends along a longitudinal axis of the fluid filter 12 and is surrounded by a substantially circular trough 28 that is formed on the top end cap 18. In order to allow fluid communication between the inner core 24 of the fluid filter 12 and the pressure relief structure 50, a passageway 30 extends through the nozzle 26 so that the air/vapor pressure on each end of the nozzle 26 is equalized.

The fluid filter 12 may include a fluid impervious divider 32 that divides the interior space 4 of the upright housing 2 between the fluid filter 12 and the sidewall 7 of the upright housing 2. The divider 32 has a top portion 34 that is either integrally or sealingly connected to the top end cap 18 of the fluid filter 12. The divider 32 is substantially cylindrical, such that a bottom portion 36 of the divider 32 extends downward substantially parallel to the filter element 14. It should be noted, however, that the present invention is not limited to the cylindrical divider 32, but rather, the divider 32 may also be substantially frustroconical, wherein the divider 32 tapers outwardly from the filter element 14 such that the bottom portion 36 of the divider 32 is spaced from the filter element 14. In both embodiments, the divider 32 essentially divides the interior space 4 of the upright housing 2 into an inner portion 38 and an outer portion 40. The inner portion 38 is the space contained between the outside or unfiltered side of the filter element 14 and the inner surface of the divider 32. The outer portion 40 is the space contained between the outer surface of the divider 32 and the inner surface of the sidewall 7 of the upright housing 2. The inner and outer portions 38, 40 remain in fluid communication at the bottom of the upright housing 2.

In order to secure the fluid filter 12 with respect to the base portion 3, a compression spring 42 at the top of the upright housing 2 engages the fluid filter 12 to maintain the fluid filter 12 in a sealed relationship with the base portion 3. The spring 42 is seated on a shoulder 11 formed on the interior of the upright housing 2 around the threaded bore 9. The opposite end of the spring 42 is seated in the circular trough 28 formed in the top end cap 18 of the fluid filter 12. The circular trough 28 functions to maintain an upright axial alignment of the fluid filter 12 within the upright housing 2 but could be omitted.

Figure 3:
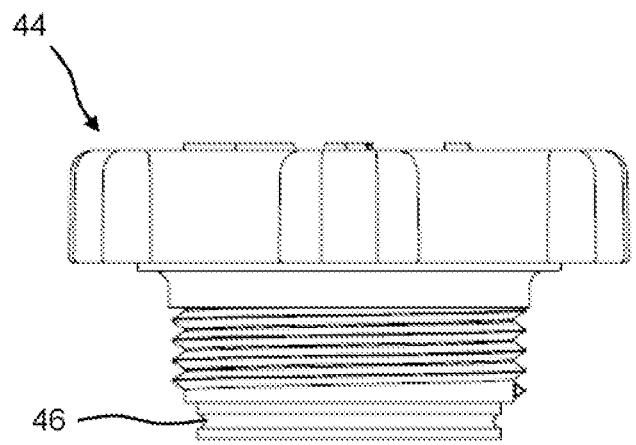
FIG. 3 is a side view showing a vent knob of the fluid filter assembly of FIG. 1 of the present invention.
Figure 4:
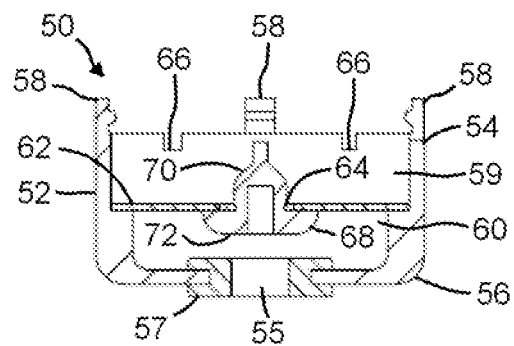
FIG. 4 is a sectional view of a pressure relief assembly of the fluid filter assembly of FIG. 1 of the present invention.

As best seen in FIGS. 3 and 4, the pressure relief structure 50 includes a housing 52 having an upper end 54 and a lower end 56. A connecting structure, such as an annular lip or a plurality of fingers 58, is provided at the upper end 54 of the housing 52 to engage a groove 46 or similar structure provided on the vent cap 44 in order to connect the housing 52 of the pressure relief structure 50 to the vent cap 44. It will be understood that the housing 52 could be connected to the vent cap 44 by other means, such as adhesives or sonic welding; in which case, the fingers 58 and the groove 46 would be unnecessary. In addition, the housing 52 could be integrally formed with the vent cap 44.

In order to connect the housing 52 to the fluid filter 12, a filter interface passage 55 is formed through the housing 52 at the lower end 56 thereof. A sealing means, such as a gasket 57, may be provided within the filter interface passage 55 to provide a sealed connection of the pressure relief structure 50 with the fluid filter 12. The gasket 57 is annular, such that it may surround the nozzle 26 of the fluid filter 12 and may be substantially tubular, have a C-shaped cross-section, or otherwise be configured to provide a seal with respect to the nozzle 26, as seen in FIGS. 1 and 4.

The housing 52 has a hollow interior 59, 60 that is bifurcated by a divider plate 62. In particular, the divider plate 62 divides the hollow interior 59, 60 of the housing 52 into an upper interior portion 59 and a lower interior portion 60. An aperture 64 extends through the divider plate 62 for fluid communication between the upper interior portion 59 and the lower interior portion 60. The upper interior portion 59 is in fluid communication with the interior space 4 of the upright housing 2 of the fluid filter assembly 10 by way of vent ports 66 that extend through the housing 52 near the upper end 54 of the housing 52. The lower interior portion 60 is in fluid communication with the inner core 24 of the fluid filter 12 through the filter interface passage 55.

In order to selectively establish fluid communication between the upper and lower interior portions 59, 60 of the housing 52, a normally closed, pressure sensitive valve 68 is disposed within the aperture 64 that extends through the divider plate 62 or may be seated within a separate aperture. The air/vapor pressure acting on an upper side 70 of the pressure sensitive valve 68 is the air/vapor pressure in the interior space 4 of the fluid filter assembly 10, while the pressure acting on a lower side 72 of the pressure sensitive valve 68 is the pressure within the inner core 24 of the fluid filter 12. When the pressure across the pressure sensitive valve 68 reaches a predetermined pressure, the pressure sensitive valve 68 moves from a closed position to an open position. The pressure sensitive valve 68 opens by disengaging from at least a portion of the aperture 64. When the pressure sensitive valve 68 is in the open position, gases, vapors, and/or liquids are allowed to pass through the aperture 64 from the upper interior portion 59 to the lower interior portion 60 of the housing 52 of the pressure relief structure 50.

The fluid filter assembly 10 of FIG. 1 is adapted to be utilized in conjunction with the spring 42, which biases the fluid filter 12 downward onto the fluid outlet 6 so that the fluid filter 12 engages the base portion 3. Any variation of the vertical position of the fluid filter 12 with respect to the pressure relief structure 50 is accommodated by the length of the nozzle 26 of the fluid filter 12, in that the degree of insertion of the nozzle 26 into the filter interface passage 55 and gasket 57 may vary according to the vertical position of the fluid filter 12 with respect to the pressure relief structure 50. However, it will be understood that the spring 42 could be omitted.

In operation, fluid enters the fluid inlet 5 of the fluid filter assembly 10 of FIG. 1 and accumulates within the interior space 4 defined by the base portion 3 and the upright housing 2 of the fluid filter assembly 10. By employing the divider 32 and the pressure relief structure 50, the fluid level can be made to rise approximately in proportion to the plugging rate of the filter element 14. This gives an accurate visual indicator as to the remaining life of the filter element 14.

When the fluid level approaches the bottom portion 36 of the divider 32, the fluid continues to rise in the area between the filter element 14 and the inner surface of the divider 32, which was previously defined as the inner portion 38 of the interior space 4 of the upright housing 2. However, the fluid does not initially rise between the outer surface of the divider 32 and the side wall 7 of the upright housing 2, which was previously defined as the outer portion 40 of the interior space 4 of the upright housing 2. This is because trapped air/vapor prevents the rise of fluid in the outer portion 40 of the interior space 4 of the upright housing 2.

As to the inner portion 38 of the upright housing 2, fluid and air/vapor move through the filter element 14 of the fluid filter 12 in a usual manner. The fluid level continues to rise between the filter element 14 and the inside surface of the divider 32 as the filter element 14 becomes more clogged. This continues until the fluid has risen to the full or nearly full height of the filter element 14, as previously described. Once this occurs, the pressure differential across the filter element 14 begins to increase with the increased clogging of the filter element 14. Once this pressure differential reaches a predetermined level, the pressure sensitive valve 68 of the pressure relief structure 50 may open to allow vapor/air to flow through the pressure sensitive valve 68. Thus, when the pressure differential across the filter element 14 exceeds the predetermined pressure differential level, the pressure relief structure 50 becomes the preferred flow path since its pressure differential is fixed. By way of non-limiting example, the predetermined pressure differential could be a predetermined pressure differential in the range of 3-6" Hg. Since air/vapor is closest to the pressure relief structure 50, the air/vapor flows through the pressure sensitive valve 68 of the pressure relief structure 50 first. As the fluid level begins to rise in the outer portion 40 of the interior space 4 of the upright housing 2, the fluid level provides a visual indicator to the operator as to when the filter element 14 should be replaced. Once the user sees that the fluid level in the outer portion 40 of the upright housing 2 has risen to the top of the fluid filter 12, the user knows to replace the fluid filter 12. After the fluid level rises above the vent ports 66 of the pressure relief structure 50, fluid may also flow through the pressure sensitive valve 68 along with the air/vapor. Again, by not having the pressure sensitive valve 68 built into the fluid filter 12, the cost of replacing the fluid filter 12 is reduced, as the pressure sensitive valve 68 need not be replaced.

Figure 5:
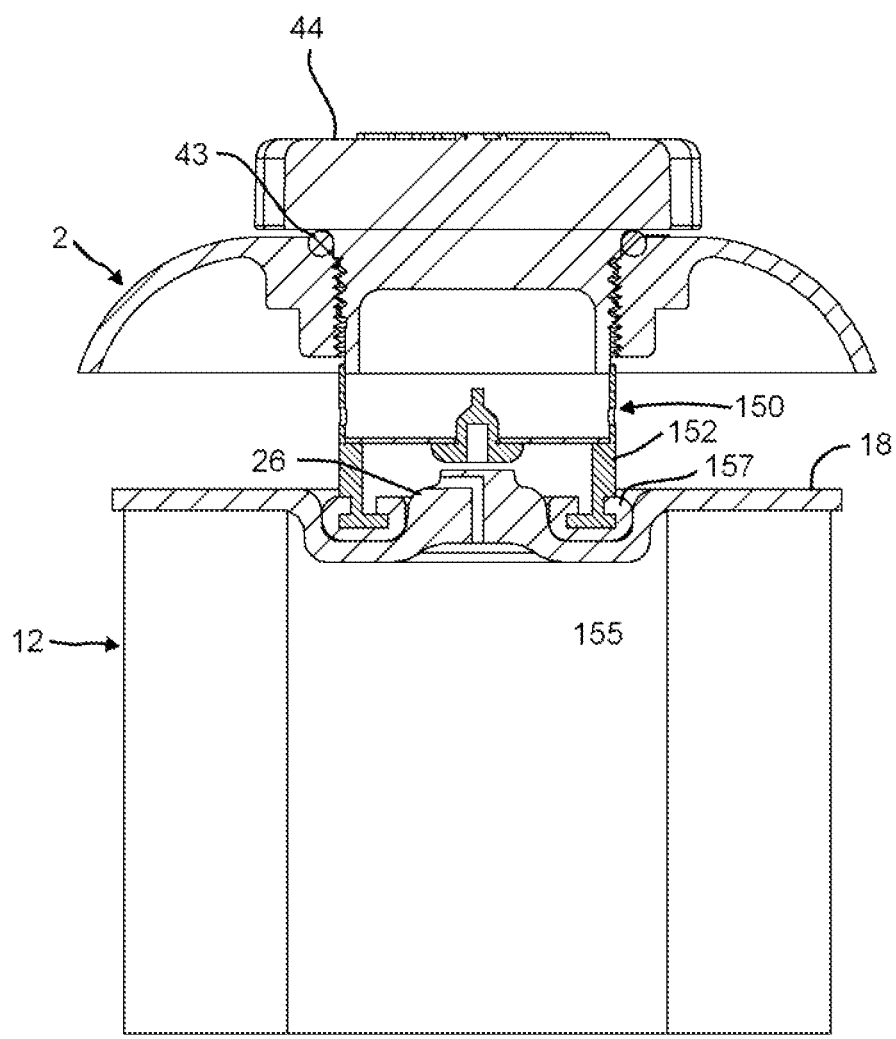
FIG. 5 is a schematic drawing showing a fluid filter assembly having a vent knob with an integrated relief valve according to a second embodiment of the present invention.
Figure 6:
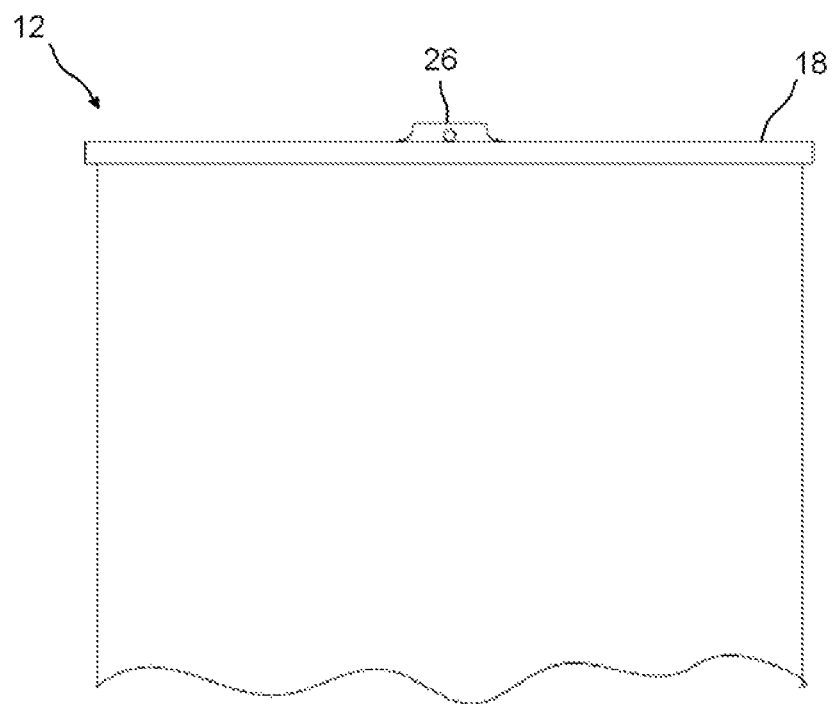
FIG. 6 is a side view showing a fuel filter for use with the fluid filter assembly of FIG. 5 of the present invention.
Figure 7:
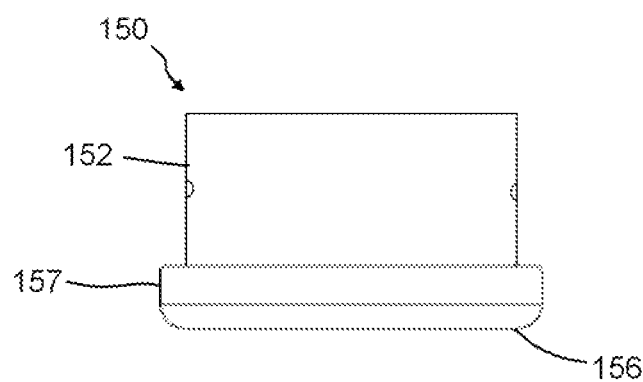
FIG. 7 is a side view of a pressure relief assembly of the fluid filter assembly of FIG. 5 of the present invention.

FIGS. 5-7 show a second embodiment of the fluid filter assembly 10, which includes an alternative pressure relief structure 150. The pressure relief structure 150 is similar to the pressure relief structure 50 described in connection with FIG. 1, except as noted herein. So that the pressure relief structure 150 may urge the fluid filter 12 into engagement with the base portion 3 of the fluid filter assembly 10, the length of a housing 152 of the pressure relief structure 150 is selected to completely occupy the vertical space between the vent cap 44 and the top end cap 18 of the fluid filter 12 when the fluid filter 12 is firmly seated upon the base portion 3. In order to provide a seal between the housing 152 of the pressure relief structure 150 and the fluid filter 12, an annular face seal 157 is provided on a lower end 156 of the housing 152 and extends into a filter interface passage 155 of the housing 152. The annular face seal 157 is configured to be received within the circular trough 28 that extends around the nozzle 26 of the fluid filter 12 such that the annular face seal 157 sealingly engages the end cap of the fluid filter 12. Notably, the embodiment shown in FIGS. 5-7 does not require a compression spring to urge the fluid filter 12 into engagement with the base portion 3.

Operation of the embodiment of the fluid filter assembly 10 of FIG. 5 is identical to that of the fluid filter assembly 10 of FIG. 1.

Figure 8:
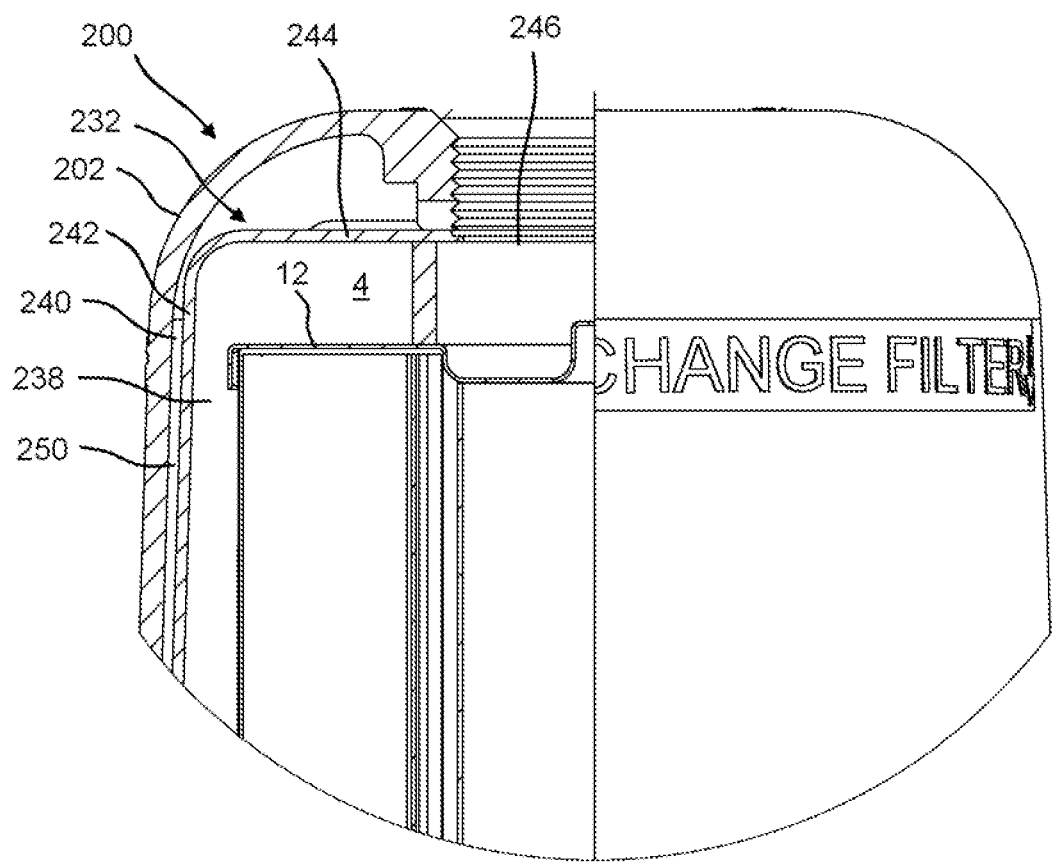
FIG. 8 is a schematic drawing showing a fluid filter assembly of the present invention having a cover with an integral divider.

FIG. 8 shows a third embodiment of the fluid filter assembly 10, wherein a fluid filter assembly 200 having a divider 232 is connected to or formed integrally with an upright housing 202 thereof. The fluid filter assembly 200 may be used in conjunction with a pressure relief structure 50, as shown in FIG. 1, a pressure relief structure 150, as shown in FIG. 5, or with a pressure relief structure 50 that is provided as a portion of the fluid filter 12.

Figure 9:
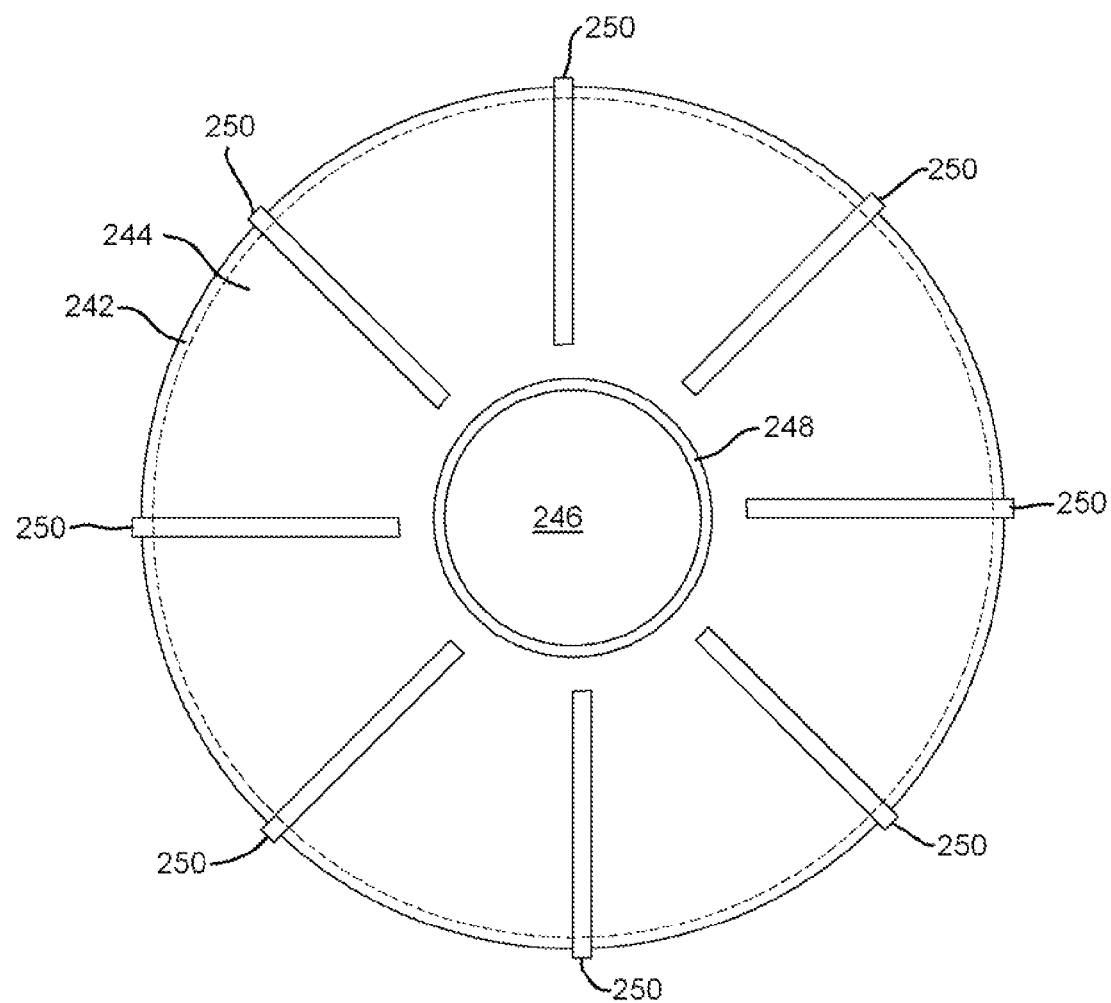
FIG. 9 is a top view of the divider of the fluid filter assembly of FIG. 8 of the present invention.

As best seen in FIGS. 8 and 9, the divider 232 is generally cylindrical in shape, having a sidewall 242 that creates a generally tubular shape for the divider 232 below an axial end cap 244 of the divider 232. A central aperture 246 is defined through the axial end cap 244. An annular sealing ring 248 surrounds the central aperture 246 and is located on the interior of the divider 232 in order to create a seal between the divider 232 and the fluid filter 12. A plurality of ribs 250 are arrayed circumferentially around the sidewall 242 and axial end cap 244 of the divider 232 in order to strengthen the divider 232 and space the sidewall 242 from the upright housing 202. The ribs 250 may engage the upright housing 202 in a friction fit. The divider 232 may be ultrasonically welded to the upright housing 202, for example, adjacent to the central aperture 246. Alternatively, the divider 232 could be fabricated integrally with the upright housing 202. The upright housing 202 and the divider 232 may be fabricated from a plastic material.

The divider 232 divides the interior space 4 within the upright housing 202 into an interior portion 238 that is disposed between the divider 232 and the fluid filter 12 and an exterior portion 240 that is disposed between the upright housing 202 and the divider 232. The interior portion 238 and the exterior portion 240 are in fluid communication at the bottom edge of the sidewall 242 of the divider 232. The annular sealing ring 248 prevents fluid communication between the interior portion 238 and the exterior portion 240 at the top of the divider 232. Preferably, the divider 232 is opaque, while at least a portion of the upright housing 202 is transparent or translucent. In this manner, the fluid level within the exterior portion 240 of the interior space is visible from outside the fluid filter assembly 200, while the fluid level in the interior portion 238 is not visible.

Operation of the divider 232 during filtering of the fluid is as described in connection with the divider 32 of the fluid filter assembly 10 of FIG. 1.

Figure 10:
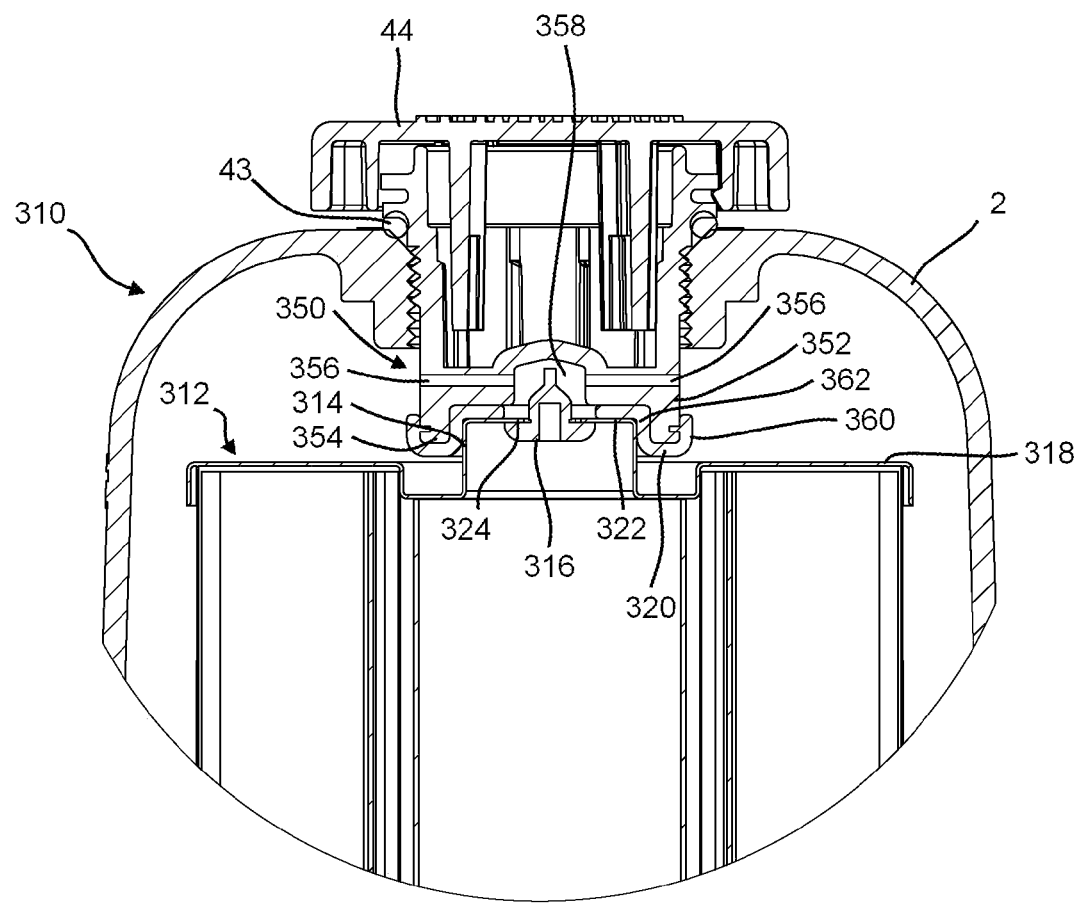
FIG. 10 is a schematic drawing showing a fluid filter assembly of the present invention for use with a fuel filter having a cylindrical mounting member, wherein the fuel filter has an integrated relief valve.

According to a further embodiment of the invention, FIG. 10 shows a fluid filter assembly 310. The fluid filter assembly 310 includes a fluid filter 312 having a substantially cylindrical mounting member 314 and an integral pressure sensitive valve 316 provided on or within the cylindrical mounting member 314. The fluid filter assembly 310 also includes a connecting structure 350 that is connected to or formed integral with the vent cap 44, which is as described in connection with the embodiment of FIG. 1, for use with an upright housing 2 (shown in FIG. 1) of the fluid filter assembly 310. The connecting structure 350 is engageable with the cylindrical mounting member 314 of the fluid filter 312 to stabilize the fluid filter 312 axially within the upright housing 2.

The cylindrical mounting member 314 of the fluid filter 312 is disposed along a longitudinal axis of the fluid filter 312 and extends upward from a top end cap 318 of the fluid filter 312. An arcuate, substantially circular trough 320 may be formed on the top end cap 318 around the cylindrical mounting member 314. The cylindrical mounting member 314 extends from the arcuate trough 320 or from the top end cap 318 to an upper axial wall 322 of the cylindrical mounting member 314. In order to allow the passage of air/vapor and/or fluids into the interior of the fluid filter 312, an aperture 324 is formed through the upper axial wall 322 of the cylindrical mounting member 314 and may be disposed along the longitudinal axis of the fluid filter 312.

In order to control the passage of air/vapor and/or fluids into the fluid filter 312 through the aperture 324 in the cylindrical mounting member 314, the pressure sensitive valve 316 is mounted in the aperture 324 or within a separate aperture that is adjacent to the aperture 324 to selectively establish or prevent fluid communication into the interior of the fluid filter 312 through the aperture 324. Operation of the pressure sensitive valve 316 is identical to that described in connection with the pressure sensitive valve 68 of the embodiment of FIG. 1. In particular, the pressure sensitive valve 316 allows passage of air/vapor and/or fluids through the aperture 324 at or above a predetermined pressure. Although the present invention is ideally suited for the pressure sensitive valve 316 to be fabricated from a pressure sensitive rubber valve member, the pressure sensitive valve 316 may be provided in the form of any valve structure operable to perform this function, including check ball valves or restricted filtration media that prevents the passage of air/vapor and/or fluids below the predetermined pressure.

The connecting structure 350 of the fluid filter assembly 310 is an open-ended substantially cylindrical structure having an interior diameter that corresponds to the exterior diameter of the cylindrical mounting member 314 of the fluid filter 312. In particular, the connecting structure 350 includes a cylindrical wall 352 that is connected to or formed integrally with the vent cap 44. The cylindrical wall 352 defines an open end 354 opposite the vent cap 44. Vent passages 356 are formed through the cylindrical wall 352 of the connecting structure 350 adjacent to the vent cap 44 in order to allow fluid communication between the interior of the upright housing 2 and an interior space 358 that is defined within the cylindrical wall 352. When the connecting structure 350 is seated on the cylindrical mounting member 314, the interior space 358 is in fluid communication with the pressure sensitive valve 316.

In order to connect and seal the connecting structure 350 with respect to the cylindrical mounting member 314 of the fluid filter 312, a sealing member 360 is provided on the cylindrical wall 352 of the connecting structure 350. The sealing member 360 may be fabricated from any suitable gasket material, such as rubber. The sealing member 360 may be disposed on the cylindrical wall 352 at the open end 354 thereof, and/or on an interior surface 362 of the cylindrical wall 352.

Operation of the fluid filter assembly 310 is as described in connection with the fluid filter assembly 10 of FIG. 1.

Figure 11:
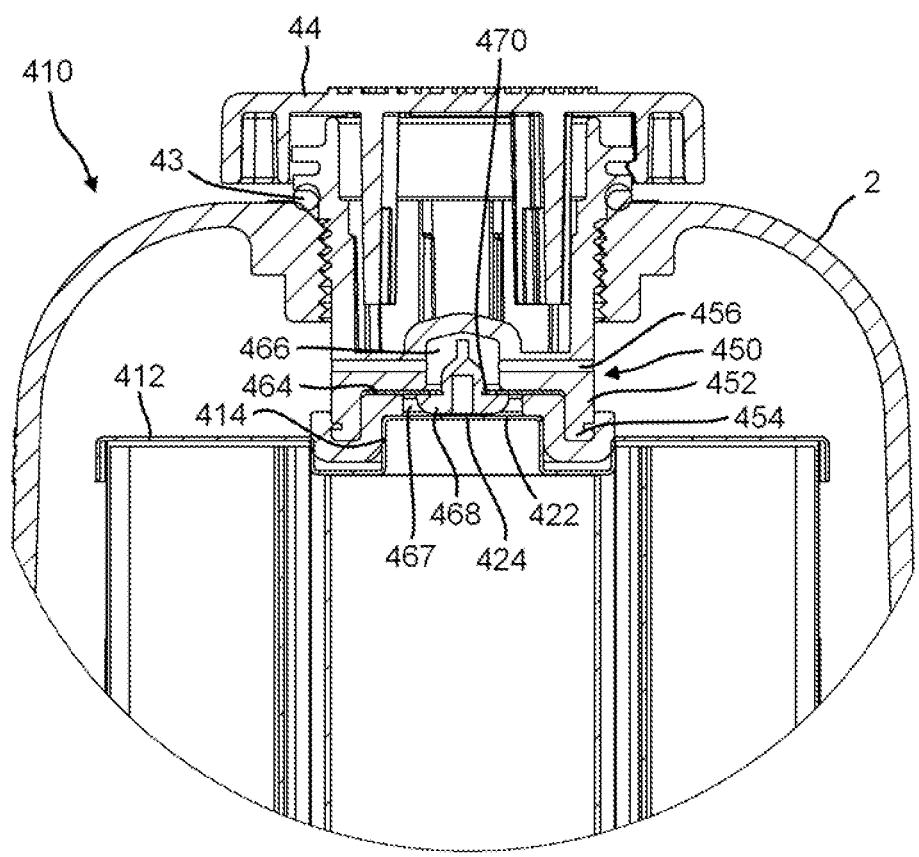
FIG. 11 is a schematic drawing showing a fluid filter assembly of the present invention for use with a fuel filter having a cylindrical mounting portion, wherein the fluid filter assembly includes a vent knob having an integrated relief valve.

As shown in FIG. 11, a fluid filter assembly 410 according to a further embodiment of the invention includes a fluid filter 412 having a cylindrical mounting member 414 for engagement with a connecting structure 450 that has a pressure sensitive valve 468 disposed therein. The fluid filter 412 and the cylindrical mounting member 414 are identical to the fluid filter 312 and cylindrical mounting member 314 described in connection with FIG. 10, with the exception that the fluid filter 412 does not have a pressure sensitive valve disposed therein.

The connecting structure 450 is similar to the connecting structure 350 described in connection with FIG. 10, and thus includes a cylindrical wall 452 having an open end 454 and vent passages 456. However, the connecting structure 450 differs from that shown and described in connection with FIG. 10 by inclusion of the pressure sensitive valve 468 therein.

In order to provide the pressure sensitive valve 468 in the connecting structure 450, a divider 464 is disposed within the connecting structure 450 and is a disc-like structure that is oriented substantially perpendicular to the longitudinal axis of the connecting structure 450. Accordingly, the divider 464 cooperates with the cylindrical wall 452 of the connecting structure 450 to define an upper interior space 466 and a lower interior space 467 of the connecting structure 450. The upper interior space 466 of the connecting structure 450 is in fluid communication with the vent passages 456. The lower interior space 467 of the connecting structure 450 is adjacent to the open end 454 defined by the cylindrical wall 452 of the connecting structure 450 such that the lower interior space 467 of the connecting structure 450 is in fluid communication with an aperture 424 formed through an axial end wall 422 of the cylindrical mounting member 414 of the fluid filter 412. Thus, air/vapor and/or fluids are able to enter the interior of the fluid filter 412 through the aperture 424 from the lower interior space 467 of the connecting structure 450.

In order to selectively establish and prevent fluid communication between the upper interior space 466 and the lower interior space 467 of the connecting structure 450, an aperture 470 is formed through the divider 464, and the pressure sensitive valve 468 is disposed within the aperture 470 or within an additional aperture. The pressure sensitive valve 468 of the connecting structure 450 is identical in structure and function to the pressure sensitive valve 68 described in connection with FIG. 1. Accordingly, air/vapor and/or fluids may pass the pressure sensitive valve 468 at or above the predetermined pressure.

Operation of the fluid filter assembly 410 is as described in connection with the fluid filter assembly 10 of FIGS. 1-4.

Figure 12:
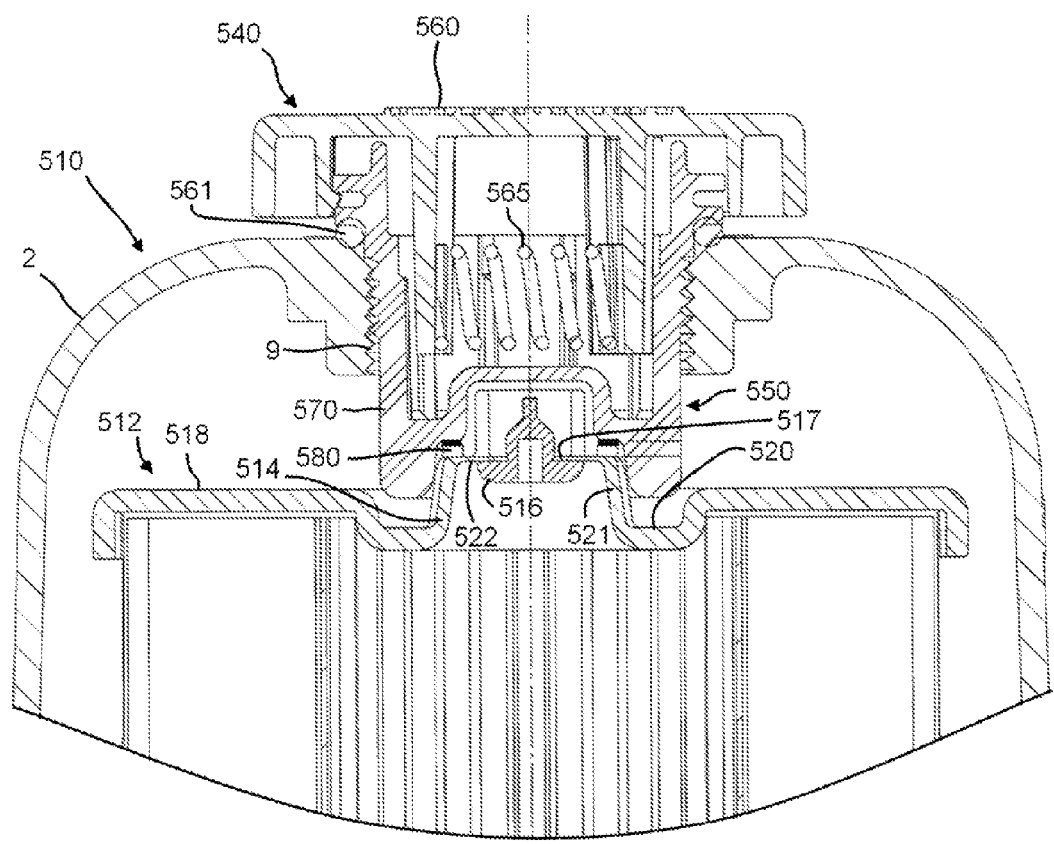
FIG. 12 is a sectional view showing a fluid filter assembly of the present invention having a modular fluid filter interface.
Figure 13:
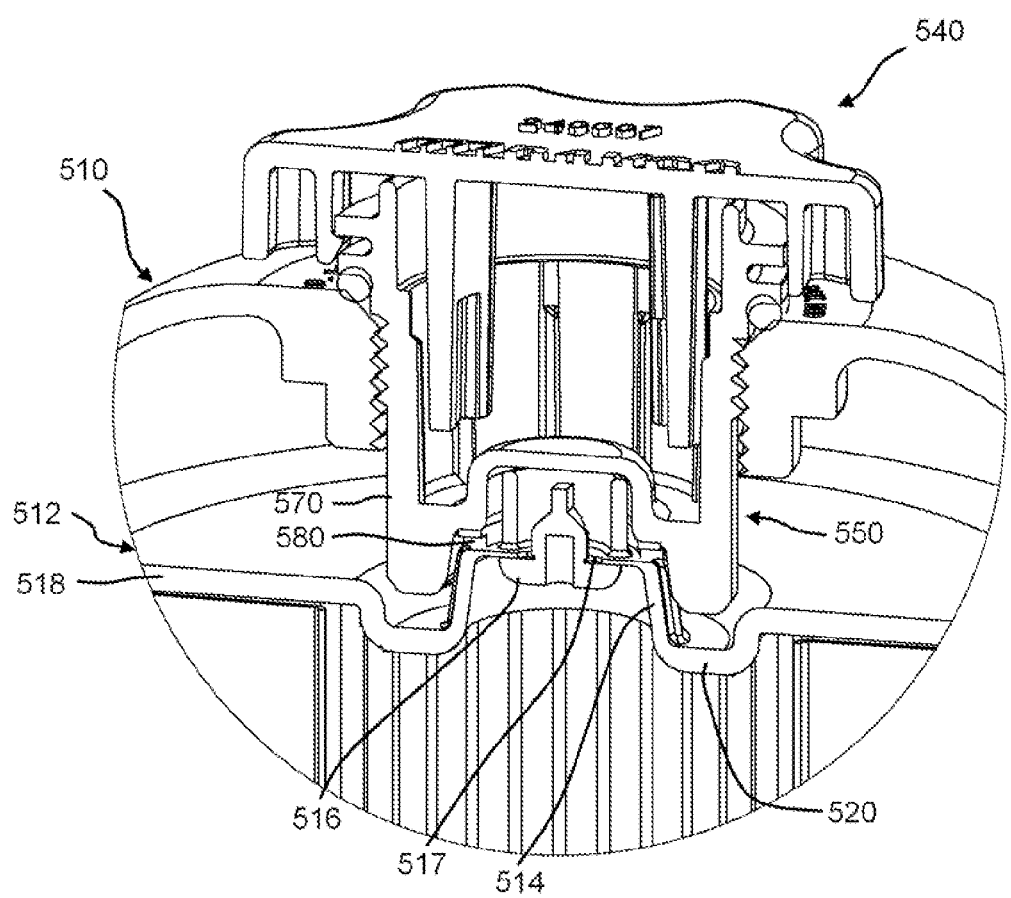
FIG. 13 is a perspective view showing the modular fluid filter interface of FIG. 12.

FIGS. 12-13 show a fluid filter assembly 510 having a modular fluid filter interface. The fluid filter assembly 510 includes a fluid filter 512 having a substantially cylindrical mounting member 514 that is formed on a top end cap 518 of the fluid filter 512. An integral pressure sensitive valve 516 is provided on or within the cylindrical mounting member 514. The fluid filter assembly 510 also includes a connecting structure 550 that is connected to or formed integral with a vent cap 540. The vent cap 540 is threadedly connected to the threaded bore 9 of the upright housing 2, which is as described in connection with the embodiment of FIG. 1. The connecting structure 550 is engageable with the cylindrical mounting member 514 of the fluid filter 512 to stabilize the fluid filter 512 within the upright housing 2.

Figure 14:
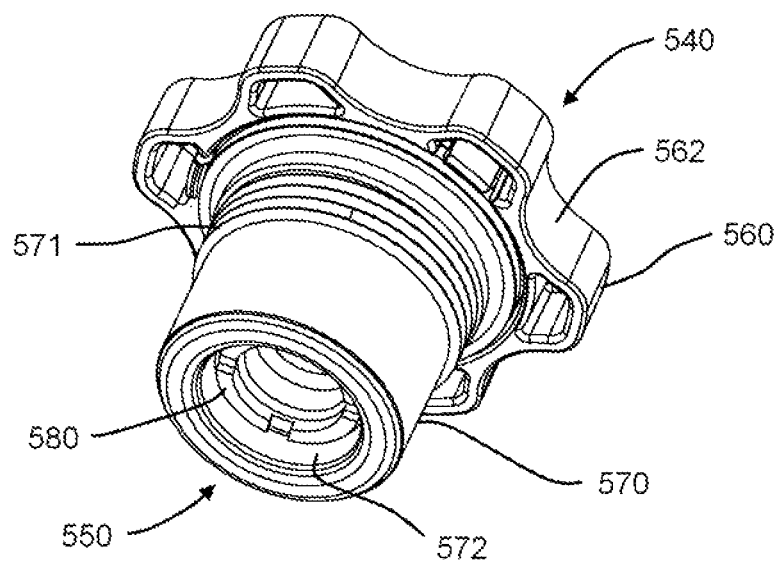
FIG. 14 is a perspective view showing a vent knob of the modular fluid filter interface of FIG. 12.

As shown in FIG. 14, the vent cap 540 has an upper portion 560 and a lower portion 570. The upper portion 560 of the vent cap 540 has a contoured outer periphery 562 that is engageable with the fingers of a user to allow the user to tighten and loosen the vent cap 540 by rotating the vent cap 540 with respect to the upright housing 2 of the fluid filter assembly 510. The lower portion 570 of the vent cap 540 is substantially cylindrical and includes a threaded portion 571 on its outer periphery. The threaded portion 571 of the lower portion 570 of the vent cap 540 is engageable with the threaded bore 9 of the upright housing 2 in order to secure the vent cap 540 with respect to the upright housing 2. An interface ring 580 may be disposed within a lower cavity 572 of the lower portion 570 of the vent cap 540, which is formed opposite the upper portion 560 of the vent cap 540. The lower cavity 572 and the interface ring 580 are portions of the connecting structure 550, as will be explained in detail herein.

Figure 15:
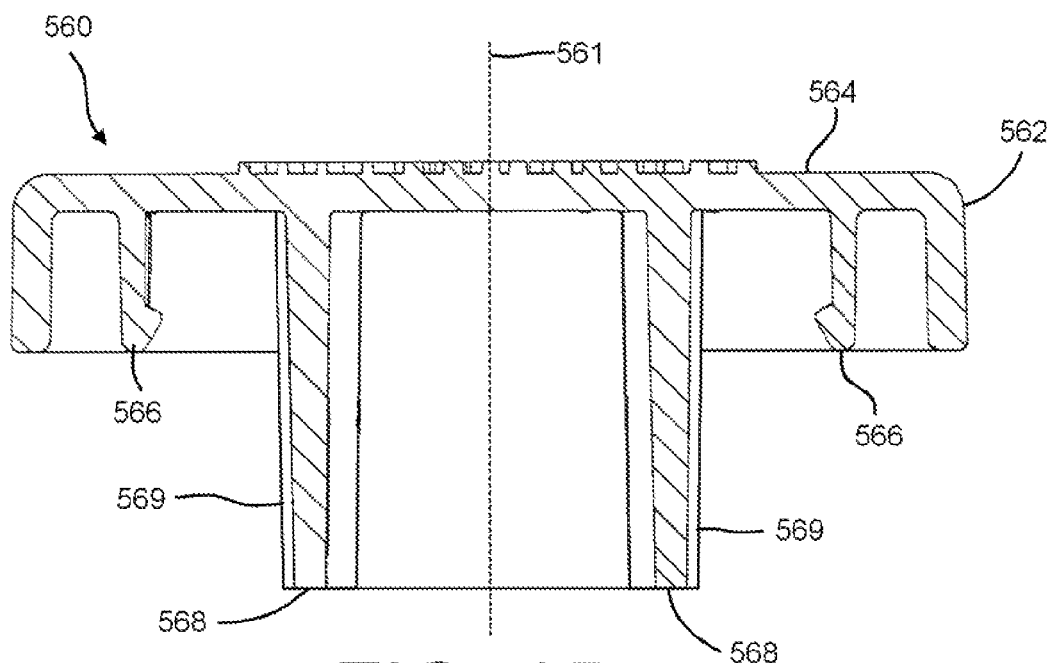
FIG. 15 is a sectional view showing an upper portion of the vent knob of FIG. 14.

The upper portion of the vent cap 540 includes an axial end wall 564 that is bounded by the contoured outer periphery 562, as seen in FIG. 15. A plurality of hook-like retainers 566 extend downward from the axial end wall 564 in a circular array around a longitudinal axis 561 of the upper portion 560. Each of the hook-like retainers 566 is spaced inward from the contoured outer periphery 562 of the upper portion 560 of the vent cap 540. The retainers 566 exhibit some resiliency with respect to the axial end wall 564. Inward from the hook-like retainers 566, a pair of arcuate fingers 568 extend downward from the axial end wall 564, which also exhibit some resiliency with respect to the axial end wall 564. The arcuate fingers 568 are opposed from one another so that a spring 565 (FIG. 12) can be received between the arcuate fingers 568 to bias the arcuate fingers 568 away from one another. A plurality of longitudinally-extending triangular ridges 569 are formed on the outer surfaces of the arcuate fingers 568. The triangular ridges 569 may be asymmetrical, such that the triangular ridges 569 are capable of functioning as one-way camming structures, as will be explained in detail herein.

Figure 16:
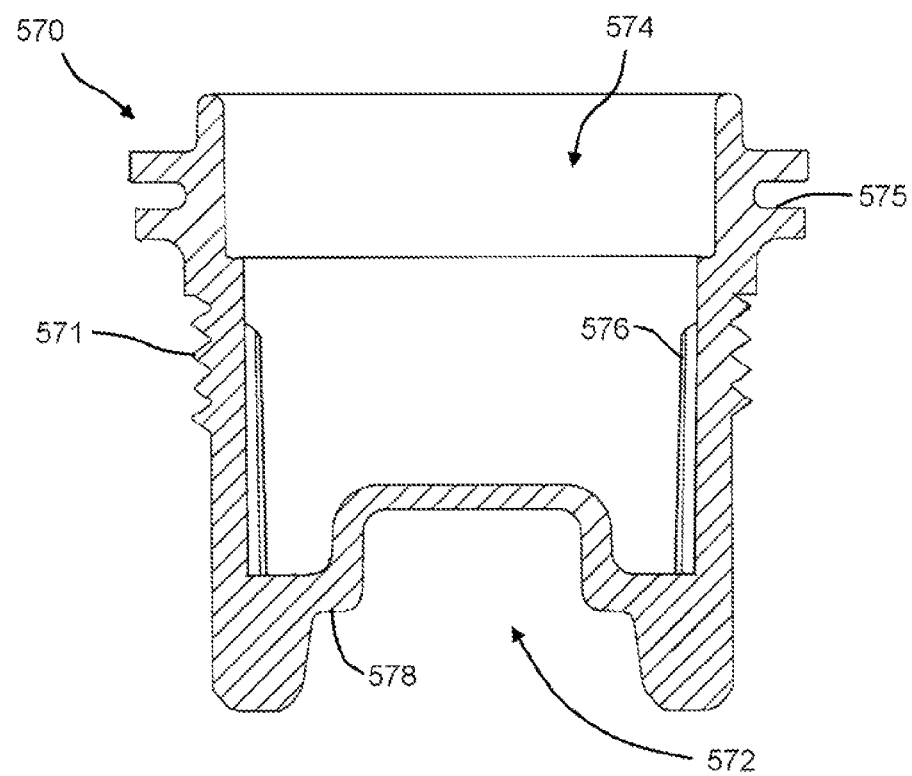
FIG. 16 is a sectional view showing a lower portion of the vent knob of FIG. 14.

The lower portion 570 of the vent cap 540 is substantially cylindrical and defines the lower cavity 572, as well as an upper cavity 574, as seen in FIG. 16. A circumferential groove 575 is defined on the outer periphery of the lower portion 570 above the threaded portion 571. The circumferential groove 575 is engageable with the retainers 566 of the upper portion 560 of the vent cap 540 to releasably secure the upper portion 560 with respect to the lower portion 570. The engagement between the circumferential groove 575 and the retainers 566 does not resist rotation of the upper portion 560 with respect to the lower portion 570.

Within the upper cavity 574 of the lower portion 570, a plurality of ridges 576 are formed on the lower portion 570 and arrayed around the interior of the upper cavity 574. The ridges 576 extend axially and are engageable with the triangular sides 569 of the upper portion 560. Engagement of the triangular sides 569 of the upper portion 560 with the ridges 576 of the lower portion 570 serves to restrain rotation of the upper portion 560 with respect to the lower portion 570. Due to the asymmetric nature of the triangular sides 569, engagement of the triangular sides 569 with the ridges 576 in a first direction serves to rotate the upper portion 560 and the lower portion 570 in unison regardless of the magnitude of torque applied. In a second direction, the triangular sides 569 are inclined such that engagement of the ridges 576 with the triangular sides 569 will displace the arcuate fingers 568 of the upper portion 560 inward slightly to allow the triangular sides 569 to rotate past the ridges 576 when the torque applied to the vent cap 540 exceeds a predetermined amount. The magnitude of torque required to allow the upper portion 560 of the vent cap 540 to rotate with respect to the lower portion 570 is determined by the stiffness of the spring 565, which resists deflection of the arcuate fingers 568 toward one another, as well as by the force required to deflect the arcuate fingers 568 themselves.

Figure 17:
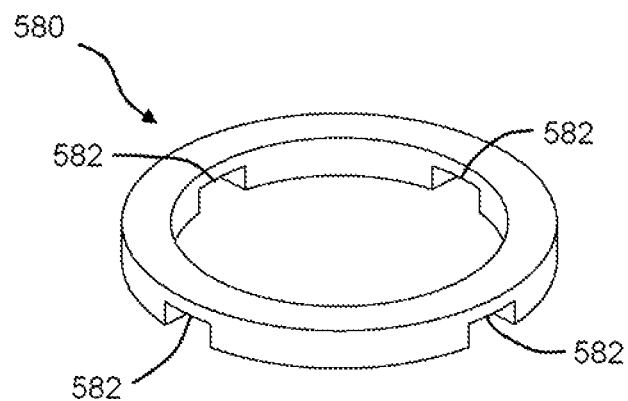
FIG. 17 is a perspective view showing an interface seal of the modular fluid filter interface of FIG. 12.

In order to provide a tolerance stack-up compensator between the vent cap 540 and the fluid filter 512, the interface ring 580 is disposed in the lower cavity 572 of the lower portion 570 of the vent cap 540. In particular, the interface ring 580 is seated on a shoulder 578 that is formed on the lower portion 570 of the vent cap 540 within the lower cavity 572. As shown in FIG. 17, the interface ring 580 is circular but includes a plurality of radially-extending passages 582 that extend completely through the interface ring 580 in the radial direction but which extend approximately halfway through the interface ring 580 in an axial direction, such that the passages 582 are open at one axial end of the interface ring 580.

Figure 18:
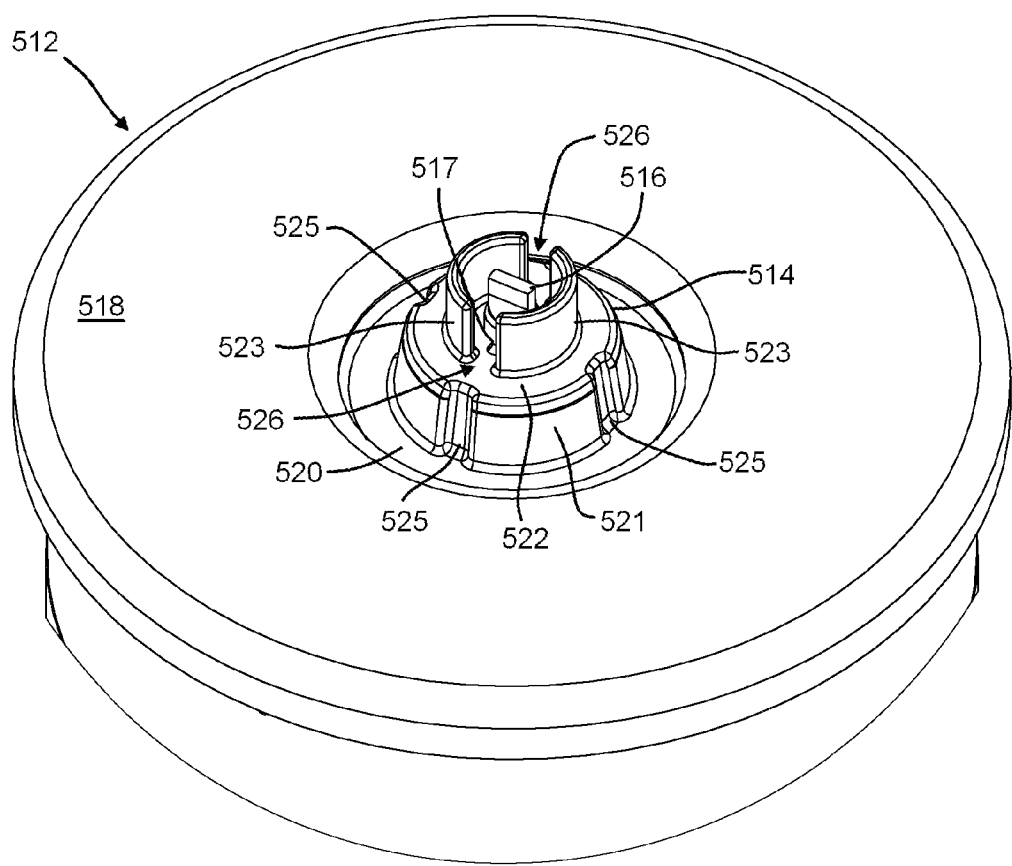
FIG. 18 is a perspective view showing an interface portion of a filter cartridge of the modular fluid filter interface of FIG. 12.

As shown in FIG. 18, the substantially cylindrical mounting member 514 of the fluid filter 512 is disposed along a longitudinal axis of the fluid filter 512 and extends upward from the top end cap 518 of the fluid filter 512. A trough 520 may be formed on the top end cap 518 around the cylindrical mounting member 514 and encircles the cylindrical mounting member 514. A radial wall 521 extends from the trough 520 to an upper axial wall 522 of the cylindrical mounting member 514. In order to allow the passage of air/vapor and/or fluids into the interior of the fluid filter 512, a plurality of axially-extending troughs 525 are arrayed around the radial wall 521 of the cylindrical mounting member 514. The relative elevations of the trough 520, the upper axial wall 522 of the substantially cylindrical mounting member, and the nominal elevation of the remainder of the top end cap 518 cooperate to trap at least a portion of the sediment that may be present within the fluid within the trough 520. In particular, the trough 520 is disposed at an elevation that is below the remainder of the top end cap 518. The upper axial wall 522 is disposed at an elevation that is above both the top end cap 518 and the trough 520. Thus, as fluid flows over the top end cap, it necessarily enters the trough 520 before traveling through the axially-extending troughs 525 on the radial wall 521 and past the pressure sensitive valve 516, as will be explained herein. While the fluid is disposed within the trough 520, gravity operates to retain the sediment within the trough 520.

The pressure sensitive valve 516 is seated within an aperture 517 that is formed through the upper axial wall 522 of the cylindrical mounting member 514. The aperture 517 and the pressure sensitive valve 516 are surrounded by a pair of arcuate walls 523 that extend upward from the upper axial wall 522. The arcuate walls 523 oppose one another and are spaced with respect to one another by a pair of gaps 526. The arcuate walls 523 extend upward from the upper axial wall 522 of the cylindrical mounting member 514 at a height that is greater than the height at which the pressure sensitive valve 516 extends outward from the upper axial wall 522 of the cylindrical mounting member 514. Accordingly, the arcuate walls 523 provide protection to the pressure sensitive valve 516 both prior to and after installation, while fluid flow is accommodated through the gaps 526.

The pressure sensitive valve 516 functions to selectively establish or prevent fluid communication into the interior of the fluid filter 512 through the aperture 517. Operation of the pressure sensitive valve 516 is identical to that described in connection with the pressure sensitive valve 68 of the embodiment described in connection with FIG. 1.

In operation, the fluid filter 512 is disposed within the upright housing 2, and the vent cap 540 is threadedly connected to the upright housing 2 by engagement of the threaded bore 9 of the upright housing 2 with the threaded portion 571 of the lower portion 570 of the vent cap 540. As the vent cap 540 is engaged with the upright housing 2, the substantially cylindrical mounting member 514 of the fluid filter 512 enters the lower cavity 572 of the lower portion 570 of the vent cap 540. As the vent cap 540 becomes fully seated with respect to the fluid filter 512, the radial wall 521 of the substantially cylindrical mounting member 514 engages the lower portion 570 of the vent cap 540, and the arcuate walls 523 extend past the shoulder 578 within the lower cavity 572 of the lower portion 570 of the vent cap 540. The interface ring 580 then engages both the upper axial wall 522 of the substantially cylindrical mounting member 514 of the fluid filter 512, as well as the shoulder 578 of the lower portion 570 of the vent cap 540. This engagement creates a partial seal between the connecting structure 550 of the vent cap 540 and the substantially cylindrical mounting member 514. When fully seated with respect to the fluid filter 512, the axially-extending troughs 525 of the substantially cylindrical mounting member 514 come into alignment with the radially-extending passages 582 in the interface ring 580.

With the vent cap 540 fully seated upon the fluid filter 512, the user may begin filtration of the fluid. Once the fluid filter 512 becomes significantly clogged, air/vapor/fluid enters the trough 520 that extends around the substantially cylindrical mounting member 514 and proceeds through the axially-extending troughs 525 on the radial wall 521 as the fluid level rises until the fluid passes through the radially-extending passages 582 of the interface ring 580 and then through the gaps 526 between the arcuate walls 523. Then, when the predetermined pressure is exceeded, the fluid may pass the pressure sensitive valve 516 and into the fluid filter 512.

Figure 19:
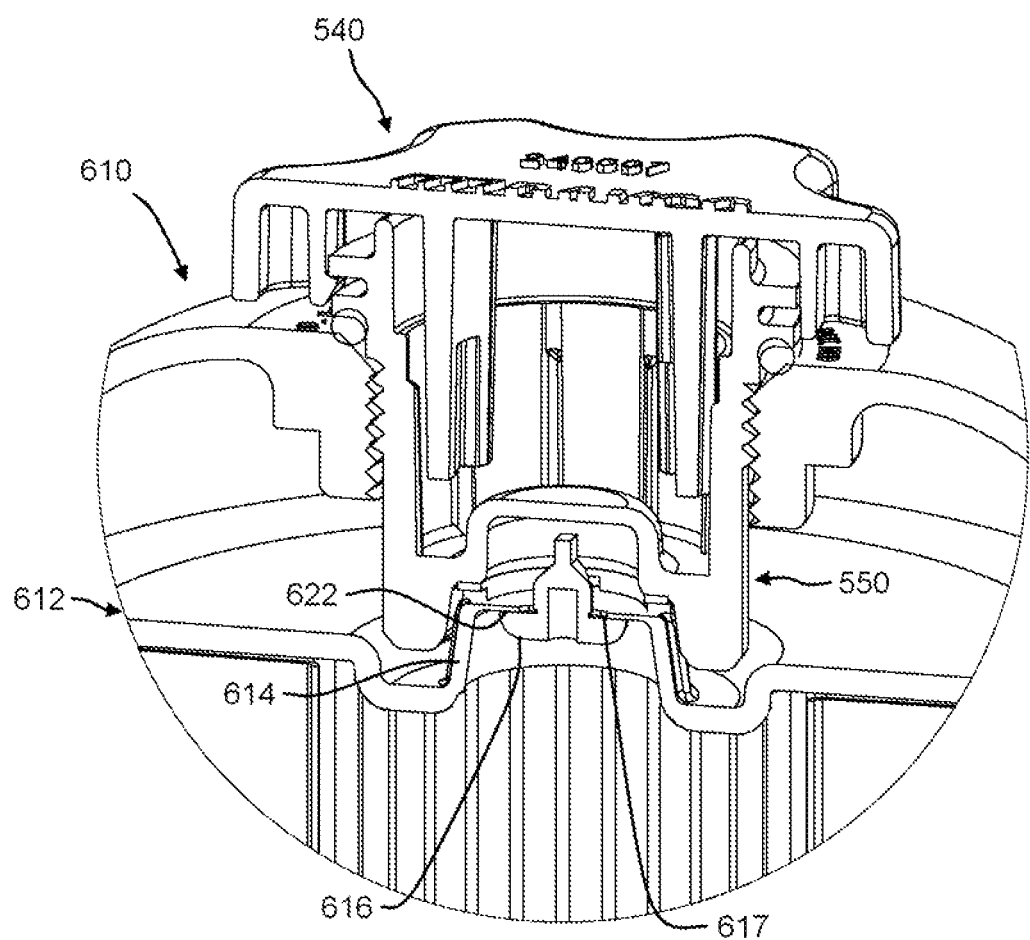
FIG. 19 is a perspective view of a modular fluid filter interface according to a second embodiment.
Figure 20:
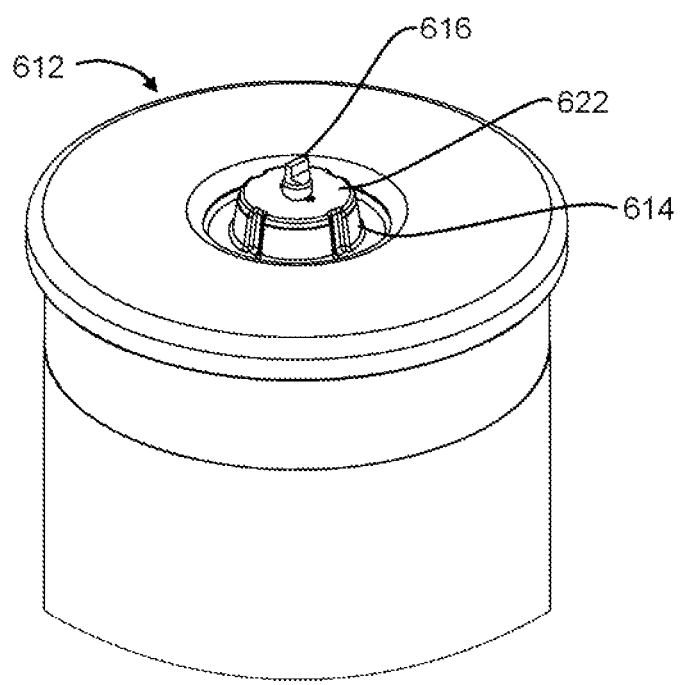
FIG. 20 is a perspective view showing an interface portion of a fuel filter cartridge of the modular fluid filter interface of FIG. 19.

FIGS. 19-20 show a fluid filter assembly 610 having an alternative modular fluid filter interface for use with the vent cap 540. The fluid filter assembly 610 is identical to the fluid filter assembly 510 with the exception that a fluid filter 612 of the fluid filter assembly 610 includes a substantially cylindrical mounting member 614 having a substantially flat axial end wall 622. The arcuate walls 523, as described in connection with the fluid filter 512, are omitted. Thus, a pressure sensitive valve 616, which is seated in an aperture 617, is the only structure that extends outward from the axial end wall 622 of the cylindrical mounting member 614.

Operation of the fluid filter assembly 610 is as described in connection with the fluid filter assembly 510 with the exception that the fluid need not pass through the gaps 526 between the arcuate walls 523 due to omission of the arcuate walls 523.

Figure 21:
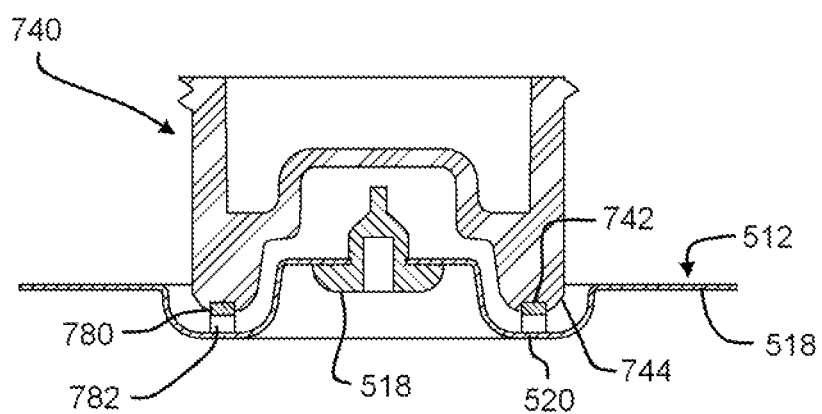
FIG. 21 is a sectional view showing a vent knob having an interface ring that is located on an axial end face of the vent knob.

In an alternative embodiment, as shown in FIG. 21, the fluid filter assembly 510 of FIG. 12 may be provided with a vent knob 740 wherein an interface ring 780 is positioned in a groove 742 that is located on an axial end face 744 of the vent knob 740. The interface ring 780 includes radially extending passages 782 and is similar in structure and function to the interface ring 580. When the vent knob 740 is installed with respect to the fluid filter 512, the groove 742 is positioned opposite the trough 520 of the fluid filter 512, such that the interface ring 780 is engaged with the vent knob 740 and the top end cap 518 of the fluid filter 512. As explained in connection with the interface ring 580, fluid may flow to the pressure sensitive valve 516 by way of the radially extending passages 582, and thus, operation is as described in connection with the fluid filter assembly 510. Of course, the vent knob 740 could also be used in conjunction with the fluid filter assembly 610 of FIG. 19.

Figure 22:
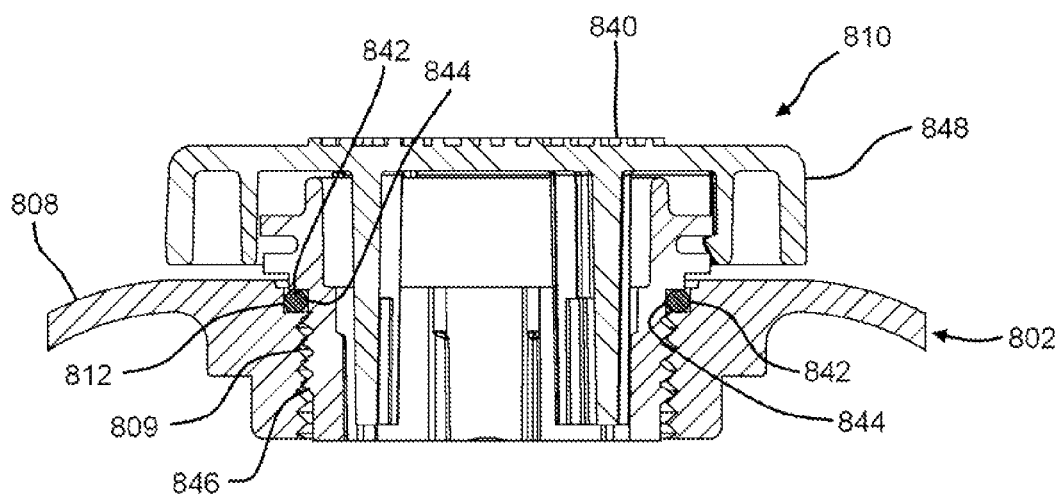
FIG. 22 is a sectional detail view of a fluid filter assembly, wherein a sealing ring is recessed with respect to a cover of the fluid filter assembly.

In another alternative embodiment, as shown in FIG. 22, a fluid filter assembly 810 includes an upright housing 802 having a recess 812. The recess 812 is formed in a spherical domed top portion 808 of the upright housing 802, adjacent and concentric to a threaded bore 809 that is formed through the substantially semi-spherical domed top portion 808. A vent cap 840 of the fluid filter assembly 810 includes a sealing ring 842 that is seated in an annular groove 844. The annular groove 844 is formed above a threaded stem portion 846 of the vent cap 840 and below a knob portion 848 of the vent cap 840. When the vent cap 840 is installed with respect to the upright housing 802, the sealing ring is disposed within the recess 812 and in engagement with the upright housing 802. The structure of the upright housing 802 and the vent cap 840 may be incorporated in any of the previous embodiments, and operation is as described in connection with those embodiments.

While the invention has been described in connection with what is presently considered to be the most practical and preferred embodiment, it is to be understood that the invention is not to be limited to the disclosed embodiments, but on the contrary, it is intended to cover various modifications and equivalent arrangements included within the spirit and scope of the appended claims, the scope is to be accorded the broadest interpretation so as to encompass all such modifications and equivalent structures as is permitted under the law.

What is claimed is:

1. A fluid filter assembly for filtering a fluid, comprising:
a housing base portion having an axially extending tube;
a housing cover, wherein the housing cover is connected to the housing base portion to define an interior space;
a filter element disposed within the interior space and in engagement with the axially extending tube, the filter element having a filter media, a bottom end cap connected to the filter media, a top end cap connected to the filter media, and a mounting member defined by the top end cap, the mounting member having an axial wall with a vent passage therethrough and a radial wall that encircles the vent passage; and
an interface structure that is connected to the housing cover and serves as an interface between the interior space and the filter element, the interface structure having an annular engaging part that defines a central opening, wherein the interface structure engages the top end cap of the filter element such that the vent passage of the mounting member is disposed within the central opening of the interface structure to create a fluid communication channel between the central opening, the vent passage, and the axially extending tube.

2. The fluid filter assembly of claim 1, wherein the housing cover defines a threaded opening, the interface structure includes a threaded portion, and the interface structure is connected to the housing cover by threaded engagement of the threaded opening of the housing cover with respect to the threaded portion of the interface structure.

3. The fluid filter assembly of claim 2, wherein the interface structure includes a knob portion that is disposed outside of the housing cover.

4. The fluid filter assembly of claim 1, wherein the interface structure engages the top end cap of the filter element via a non-threaded engagement.

5. The fluid filter assembly of claim 1, wherein the annular engaging part of the interface structure is in engagement with the top end cap of the filter element.

6. The fluid filter assembly of claim 1, wherein engagement of the filter element and the annular engaging part of the interface structure urges the filter element into engagement with the housing base portion.

7. The fluid filter assembly of claim 1, wherein the interface structure includes an annular sealing member that is in engagement with the top end cap of the filter element.

8. The fluid filter assembly of claim 1, wherein the top end cap includes a base surface that encircles the mounting member, and the annular engaging part of the interface structure is in engagement with the base surface of the top end cap.

9. The fluid filter assembly of claim 1, wherein the top end cap includes a trough that encircles the mounting member, and the annular engaging part of the interface structure is in engagement with the trough of the top end cap.

10. The fluid filter assembly of claim 1, further comprising:
a pressure relief valve disposed in the vent passage of the mounting member of the top end cap of the filter element.

11. The fluid filter assembly of claim 1, further comprising:
a pressure relief valve disposed in the interface structure for selectively preventing or allowing the fluid and/or air/vapor to pass therethrough.

12. The fluid filter assembly of claim 1, further comprising:
the interface structure including an interface housing having an upper interior portion in communication with an exterior of the filter element and a lower interior portion that is in communication with an interior of the filter element and is sealed with respect to the filter element; and
a pressure relief valve in communication with the upper interior portion and the lower interior portion of the interface housing of the interface structure for selectively allowing the fluid and/or air/vapor to pass therethrough from the upper interior portion to the lower interior portion.

13. The fluid filter assembly of claim 1, wherein the housing cover defines a threaded opening, the interface structure has an upper portion that is threadedly connected to the threaded opening of the housing cover, the interface structure has a lower portion with the annular engaging part defined thereon, and the lower portion is connected to the upper portion for rotation in unison therewith when the torque applied to the upper portion is less than a predetermined torque value and for slipping with respect to the upper portion when the torque applied to the upper portion is greater than a predetermined torque value.

14. The fluid filter assembly of claim 1, wherein the mounting member includes a plurality of arcuate walls that extend from the axial wall of the mounting element and encircle the vent passage, wherein gaps are defined between adjacent pairs of the arcuate walls.

15. The fluid filter assembly of claim 1, further comprising:
a divider that is connected to the housing cover and is positioned inside the housing cover, the divider having an upper end that is sealable with respect to the top end cap of the filter media to define an inner portion of the interior space between the divider and filter element and an outer portion of the interior space between the divider and the housing cover.

16. The fluid filter assembly of claim 15, wherein the divider includes a plurality of spacing structures that connect the divider to the housing cover.

17. The fluid filter assembly of claim 16, wherein the spacing structures are ribs.

18. The fluid filter assembly of claim 15, wherein the divider is fabricated from an opaque material to block visibility of a fluid level in the inner portion of the interior space.

19. A fluid filter assembly for filtering a fluid, comprising:
a housing base portion having an axially extending tube;
a housing cover having a threaded opening, wherein the housing cover is connected to the housing base portion to define an interior space;
a filter element disposed within the interior space and in engagement with the axially extending tube, the filter element having a filter media, a bottom end cap connected to the filter media, a top end cap connected to the filter media, and a mounting member defined by the top end cap; and
an interface structure having a upper portion that is threadedly connected to the threaded opening of the housing cover, a lower portion that is engageable with the mounting member of the top end cap of the filter element, and an interface ring having passages extending therethrough, wherein the lower portion is connected to the upper portion for rotation in unison therewith when the torque applied to the upper portion is less than a predetermined torque value and for slipping with respect to the upper portion when the torque applied to the upper portion is greater than a predetermined torque value, and wherein a fluid communication channel extends between at least the interior space, the passages of the interface ring, and the axially extending tube.

* * * * *